United States Patent [19]
Andoh et al.

[11] Patent Number: 5,778,166
[45] Date of Patent: Jul. 7, 1998

[54] AUXILIARY STORAGE CONTROLLING METHOD AND AUXILIARY STORAGE CONTROLLING APPARATUS USING THE SAME

[75] Inventors: Akihiro Andoh; Shinji Shishido; Yutaka Koshi; Koh Kamizawa, all of Nakai-machi, Japan

[73] Assignee: Fuji Xerox Co., Ltd., Tokyo, Japan

[21] Appl. No.: 733,606

[22] Filed: Oct. 18, 1996

[30] Foreign Application Priority Data

Dec. 20, 1995 [JP] Japan ................................. 7-349609

[51] Int. Cl.⁶ ........................................... G06F 11/14
[52] U.S. Cl. ...................... 395/182.04; 711/114; 371/62
[58] Field of Search ............................. 395/182.04, 441, 395/185.09; 371/62, 61; 707/104

[56] References Cited

U.S. PATENT DOCUMENTS

| | | | |
|---|---|---|---|
| 4,245,305 | 1/1981 | Gechele et al. | 364/200 |
| 5,459,853 | 10/1995 | Best et al. | 395/182.04 |
| 5,519,435 | 5/1996 | Anderson | 395/441 |
| 5,559,764 | 9/1996 | Chen et al. | 369/30 |
| 5,586,264 | 12/1996 | Belknap et al. | 395/200.08 |
| 5,592,612 | 1/1997 | Birk | 395/182.04 |
| 5,603,058 | 2/1997 | Belknap et al | 395/855 |
| 5,630,104 | 5/1997 | Ottesen et al. | 395/500 |
| 5,649,093 | 7/1997 | Hanko et al. | 395/182.04 |

FOREIGN PATENT DOCUMENTS

| | | | |
|---|---|---|---|
| 1-140326 | 1/1989 | Japan | 395/182.04 |

OTHER PUBLICATIONS

Patterson, et al. "A Case For Redundant Arrays of Inexpensive Disks (RAID)", *ACM SIGMOD Conference*, pp. 109–116, 1988.

*Primary Examiner*—Robert W. Beausoliel, Jr.
*Assistant Examiner*—Scott T. Baderman
*Attorney, Agent, or Firm*—Oliff & Berridge, PLC

[57] ABSTRACT

An auxiliary storage controlling device is able to assure the data transferring rate even when an irregular occurs. The controlling device comprises a plurality of auxiliary storage units each of which stores the same data, a readout system for reading out said data from said plurality of auxiliary storage units simultaneously in response to a readout command, a detecting system for detecting an auxiliary storage unit in which the reading out of said data is finished at the earliest, a selecting system for selecting said data which is read from said detected auxiliary storage unit, an irregular detecting system for detecting an irregular auxiliary storage unit which is still working, and a readout prohibiting system for prohibiting a consecutive readout command against said irregular auxiliary storage unit. Additional features to assure the data transferring rate are also disclosed.

10 Claims, 21 Drawing Sheets

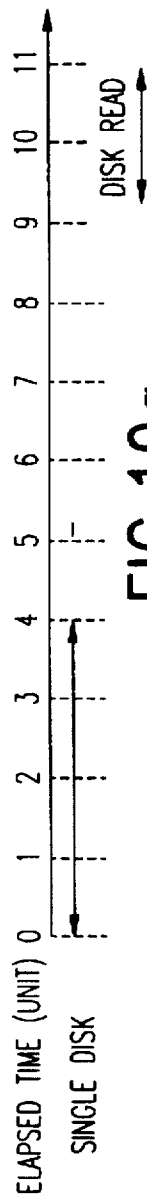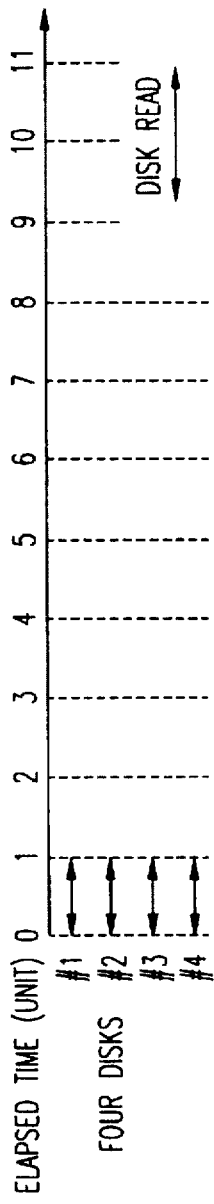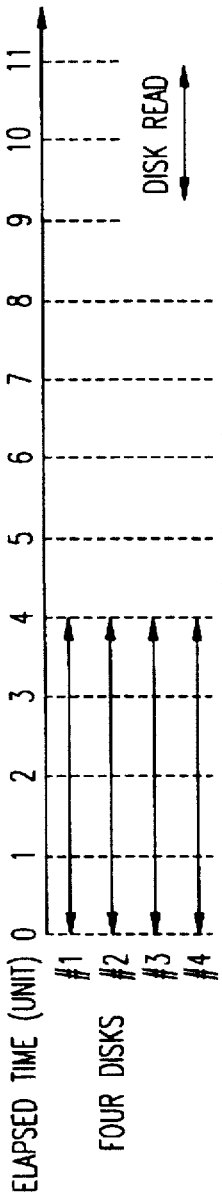

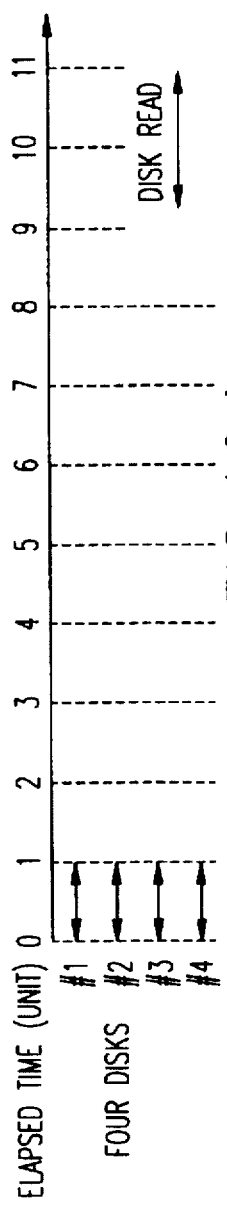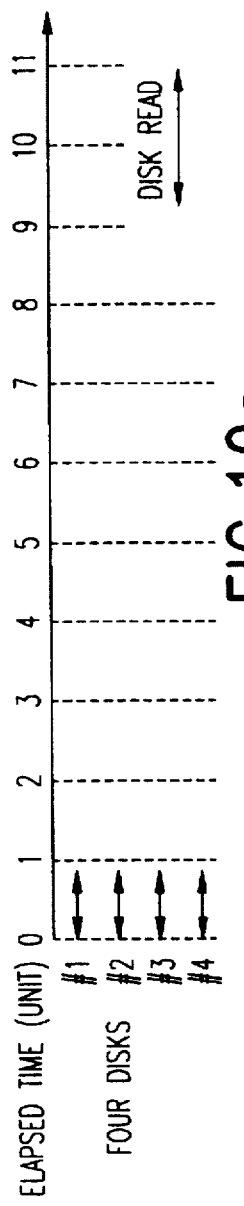

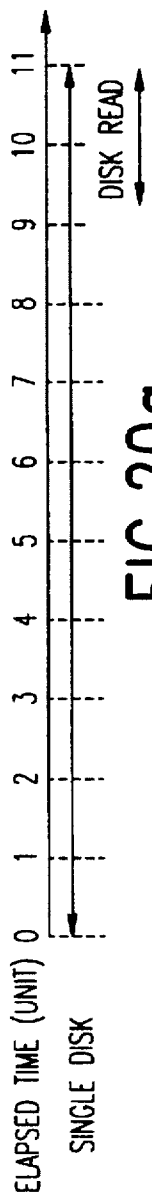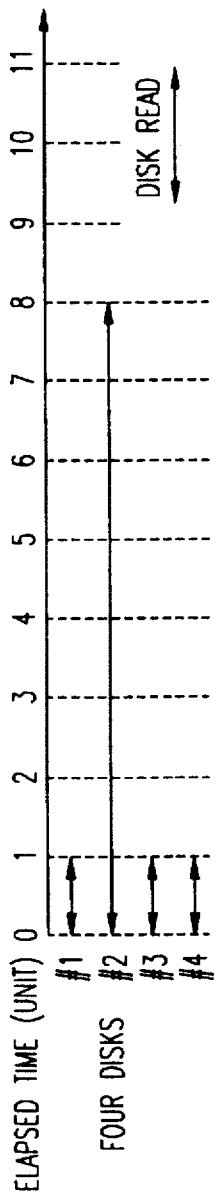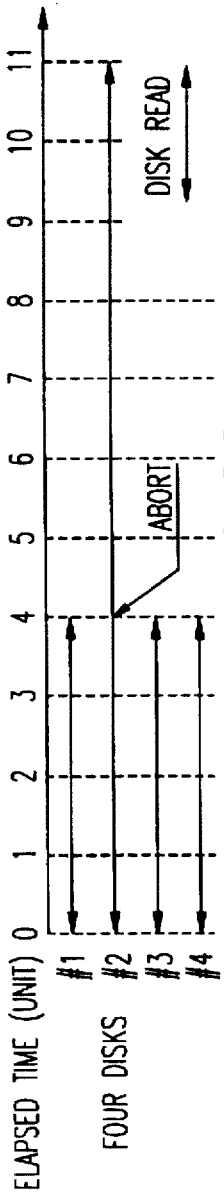

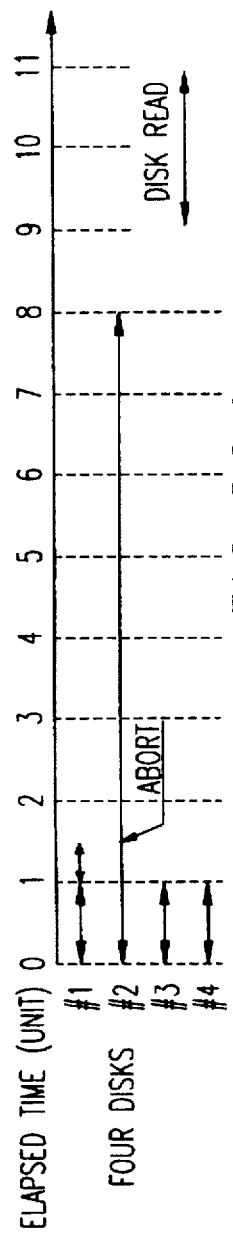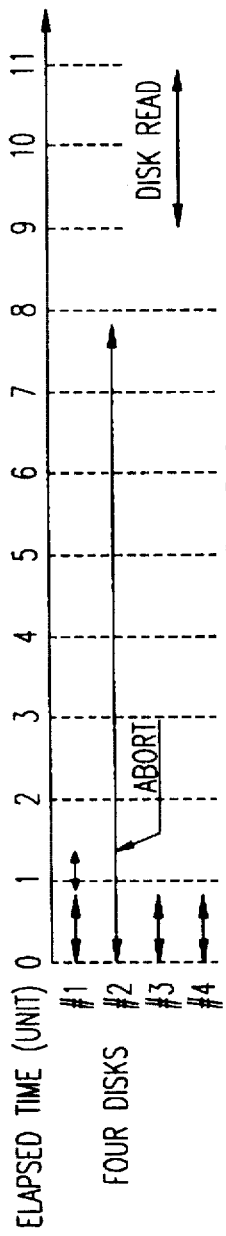

AUXILIARY STORAGE CONTROLLING METHOD AND AUXILIARY STORAGE CONTROLLING APPARATUS USING THE SAME

BACKGROUND OF THE INVENTION

This invention generally relates to a controller for controlling auxiliary storage devices. More specifically, this invention relates to a controller for the auxiliary storage devices for assuring transfer rate of readout data from the auxiliary storage devices in response to a readout command from an information processing equipment.

A random accessible hard drive is well known as an auxiliary storage for image processing equipment such as personal computers. Although a hard drive has good cost performance and relative high storage capacity, transfer rate of readout data is much slower than that of semi-conductive memory such as Random Access Memory (RAM).

It is useful to control plural hard disks in parallel as a technology for accelerating the transfer rate of the readout data of the hard drive. This is referred to as a parallel-controlled disk array, which allows high transfer rate of the readout data in several times (number of disks in maximum) of the original transfer rate of a single disk. Those control devices are disclosed in Japanese Unexamined Patent Publication (JP-A) 1-140326 and in an article by D. A. Patterson, G. Gibson, R. H. Katz, "A case for Redundant Arrays of Inexpensive Disks (RAID)", ACM SIGMOD Conference, Chicago, Ill. (June, 1988).

The prior parallel-controlled disk array will be explained by using FIG. 21 through FIG. 23. In FIG. 21, 101 is an auxiliary storage comprising number N (from #1 to #N) of disks arranged in a line, 102 is a readout device, 103 is an end detector, 104 is a selector, 105 is an inputting signal line for inputting commands or data into the auxiliary storage, 106 is an outputting signal line for outputting an end signal upon the end of readout process from the auxiliary storage, 107 is an outputting signal line for outputting data from the auxiliary storage 101, 108 is an inputting signal line for inputting commands or data into the readout device from the information processing equipment (not shown), 109 is an outputting signal line for outputting an end signal upon the end of readout processing into the information processing equipment (not shown) from the readout device 102, 110 is an outputting signal line for outputting an end signal to the readout device 102 from the end detector and 111 is an outputting signal line for outputting data to the information processing equipment (not shown) from the selector 104.

By referring to FIG. 22, the case in which a 1 MB-size file is read from the disk address "512" of the auxiliary storage (Parallel-controlled disk array) 101 by a host computer (information processing equipment) will be described hereinafter. To simplify the explanation, N (number of disks) is set to 4, which means that the auxiliary storage comprises four disks (from #1 to #4) at this time. The parallel-controlled disk array 101 reads the 1 MB-size data from the four (from #1 to #4) hard disks simultaneously and transfers the data into the buffer memory of the host computer. At first, all address length and read length values assigned for each disk are converted to be 128 (512 divided by 4) and 256 KB (1 MB divided by 4), respectively, upon a command from the host computer (Step S121). The conversion is done by the readout device 102.

Then, the readout device 102 activates each of the four disks (from #1 to #4) through the inputting signal line 105 and the data is transferred to the selector 104 through the outputting signal line 107 from each disk. (Step S122). The selector 104 selects one data transferred from one disk and outputs the data into an appropriate address of the buffer memory through outputting signal line 111. Then, after the disk sends an end signal of the data transfer to the end detector 103 through the outputting signal line 106 (Step S123), the end detector stores the end signal of the disk (Step S124) and the same steps are repeated for all remained disks. When the end detector 103 detects the end signal for all disks (Step S125), the end detector 103 outputs an end signal to the readout device 102 through the outputting line 110 and the readout device 102 outputs an end signal to the host computer through the outputting line 109.

FIG. 23 discloses a buffer status, data arrangement on the disks and transferring order of the data when the data having a data length L (=1 MB) is read from address A. In this figure, the single disk addresses indicated at the leftmost portion are the actual (original) disk addresses of each disk 101 (#1–#4) and the address numbers described in the drawing of disk 101 (#1–#4) are virtual address numbers assuming that those plural disks constitute one hard drive.

The address unit R of the parallel-controlled disk array as a whole and the address unit Ri of each disk are defined by the following equations:

$$R = \{A, A+1, A+2 \ldots A+L-1\} \quad (1)$$

$$R = R1 + R2 + R3 + R4 \quad (2)$$

$$Ri = \{j \in R | j = I-1 (\text{mod} 4)\} \quad (3)$$

Address R1 is used when a command for each disk is required. When the data having a data length L is read from the parallel-controlled disk array, the data stored at address from A/4 to (A/4)+(L/4)−1 will be read. Although, the data rearrangement is done by using the array chain of the DMAC, the host computer may rearrange the data sequence after the readout of the data. By the aforementioned operation, data stored at the address A to A+L−1 of the parallel-controlled disk array are read in parallel (Simultaneously from four disks).

FIG. 19(b) discloses the time chart of the above data transfer process. The solid arrow line is an average readout time of the disk (disk read). FIG. 19(a) discloses the time chart of the data transfer process from a single disk. By comparing both charts, it is understood that the readout time from the single disk needs four time units whereas the readout time from the arrayed disk is only one time unit. Thus, by configuring a parallel-controlled disk array using four disks, four-times data transfer rate will be obtained (in maximum).

Recently, systems for handling images in real-time, such as high-speed print server or Video-On-Demand (VOD) server, have been increasing. Those systems still require assuring of transfer rate of data as well as high capacity storage for the data during the readout. For example, in the case of a high-speed print server, the print server must provide image data to a printer in relatively high constant speed since the printer is conducting a printing process at a constant rate. Otherwise, blank pages or image-lacking pages will be printed by the printer. In the case of the VOD, if the server does not provide image data to a client at a constant rate, frame lacking or image disturbance of dynamic image will occur.

As the frame lacking problem of dynamic image is not usually detected by a user, since the frame lacking occurs in an instant, the problem will not be as significant in actual use of the dynamic image. On the other hand, as the print server handles static images, once image lacking in a line unit or block unit occurs, it will clearly be a significant problem. Such pages will be discarded as well as jammed papers. Since the printer itself has an error rate in an order of $10^{-6}$, much smaller error rate in an order of $10^{-7}$ or $10^{-8}$ is required of the print server in order to give full ability of the printer. However, as hard drive (hard disk) itself has a drawback that the readout time is not constant, it is still difficult to estimate the readout time of the data, much less assuring the readout time.

The main reasons that the hard drive (hard disk) does not have constant readout time are as follow:

(1) seek time (duration: 10 msec required for each readout time)

Since the hard drive comprises rigid disks, tracks where the data are stored and read are arranged concentrically about the center of the disk. Each track has plural sectors and the data is read by a head of the hard drive by accessing the head to an appropriate sector. If the hard drive comprises plural disks arranged in line with the center of those disks, tracks of each disk located at the same distance from the center of disks are called a cylinder. The seek time is defined as the required time to move the head to the specific cylinder. The seek time (seek movement) is divided into the following timings (movements).

i) Speeding up the head: Speed up the head until the head reaches a predetermined maximum speed or reaches a half way of the distance to be sought.

ii) Moving the head in constant rate: Move the head by the maximum speed (constant) when the head has to be moved for a relatively long distance.

iii) Reducing the speed of the head: Reduce the speed and stop the head at the near portion of the destined track.

iv) Settling the head: Controlling the position of the head precisely by a servo mechanism.

The current hard drive has an average seek time around 10 msec, which is mainly composed of the settling time of from 1 to 2 msec in the case of short-distance seek within few cylinders. In the case of relatively short-distance seek within 500 cylinders, the seek time is mainly composed of the speeding-up time for the head from 10 to 15 msec. In the case of relatively long-seek distance, the seek time is mainly composed of the constant moving of the head from 20 to 30 msec.

If the hard drive has a buffer utilizing a semiconductive memory, the average seek time of the hard drive may be shortened. During the settling after the reducing of the speed of the head, data on a readable track at this time is read and stored in the semiconductive memory. If the readable track is the aimed track, this stored data is utilized in order to shorten actual readout time of the hard drive. It is also possible to shorten the seek time by reordering readout commands or writing commands of the host computer or the hard drive itself (rescheduling of the commands), however, this is also marginal.

(2) Waiting time for Rotation (duration: 5 msec required for each readout)

As mentioned before, the hard drive comprises disks, after the head reaches to the aimed track, duration is still required to reach the head to an aimed sector. An average waiting time for rotation is defined as ½ of a reciprocal number of the rotating speed. For example, a typical current hard drive having a rotating speed of 7200 rpm (revolutions per minutes =120 rps (revolutions per second)) has the average waiting time of $4.2 \times 10^{-3}$ sec (=1/120/2). The maximum waiting time for rotation is defined as a reciprocal number of the rotating speed and the minimum waiting time for rotation is "0".

If the hard drive has the buffer as mentioned before, substantial waiting time for rotation may also be shortened. For example, after the seek time, if the head has passed the aimed sector, data on a readable track at this time is read and stored in the semiconductive memory. If the readout data is the aimed data, this stored data is utilized in order to shorten the readout time without additional readout of the data. However, this is also marginal because it depends on an access pattern of the head with respect to sectors.

(3) Read Error Retry (duration: about 10 msec, required randomly in $10^{-10}$ probability for readout)

When the analogue signal that is read from the disk is decoded into a digital signal, occasionally an error will occur due to an instability of the analogue data or an effect of noise. If the error is a correctable error, since the error will be corrected by a decoding LSI, there is no delay on the decoding process; however, if the error is an uncorrectable error, the readout process of the data will be retried. The repeating number of the retry would be set to about ten times. The retry process is the re-readout process of the sector including the error data by the head. Therefore, the delay time for each retry process is defined as the time required to make one revolution of the disk. For example, if the disk rotates at 7200 rpm, the delay time will be 8.3 msec. If the error is induced by incidental noises, such error will usually be corrected by one retry process. However, if the error is induced by a fault of the hard drive or a damaged disk, such error will not generally be corrected even by ten-times retry processes. In this case, the readout process itself will be failure as well as it requires more than 100 msec delay time.

(4) Seek Error Retry (duration: not less than 100 msec, required randomly in $10^{-6}$ probability)

Occasionally, it will be impossible to detect the aimed cylinder properly due to changing of viscous resistance of the ball bearings of a mount of disks, thermal expansion of the disks, outside vibration, or failure of servo mechanism. The head will not be able to seek the aimed cylinder by those reasons to cause the seek error.

Once the seek error occurs, the seeking process of the head, in which the repeating number is generally set to be not more than five times, will be retried. In the retry process, the head is once turned out to an outermost cylinder and is moved again to the aimed cylinder in order to enhance success rate of the retry process. Delay time for the retry process per one time is relatively high, such as about 100 msec.

(5) Thermal recalibration (duration: from 500 to 1000 msec, required one time per few ten minutes)

The temperature of the hard drive is varied according to the changing of environmental circumstances such as temperature of the motor, LSI or the like. As mentioned before, the temperature of the disk has a sensitive correlation with seek error, thus seek parameters have to be reset according to the changing of the temperature. This is called thermal recalibration.

The thermal recalibration will be done when an appropriate time has elapsed from the last thermal recalibration timing or the temperature of the hard drive exceeds a predetermined value. The intervals of the thermal recalibration is varied by products in the range from 10 minutes to 20 minutes. Generally, thermal recalibration will not be executed during the procedure of reading/writing command; however, some products execute it simultaneously with the procedure of reading/writing command. In this case, in maximum, a one minute delay will occur. Typical thermal recalibration is executed by the process comprising seeking the head between predetermined cylinders, determining the position of the cylinders, and feeding back to the seeking parameter. The process will be repeated and the seek parameters will be updated until the difference between the aimed cylinder position and the actual cylinder position is less than a predetermined value.

(6) Differences of readout time based on address location (Maximum 40 to 50 percentage difference in readout time, required for each readout)

Since the hard drive comprises disks, peripheral portions of the disk can store much data compared to inner portions of the disk, providing the data recording densities at those portions are the same. By considering the fact that the rotating speed of the disk is constant, readout time of the data at the peripheral portion is faster than that at the inner portion. Those differences are in a range from 40 percent to 50 percent in difference in readout time, although they depend on products.

Among the aforementioned reasons (1) to (6) that the hard drive (hard disk) does not have constant readout time, the differences of the readout time based on reasons (1), (2) and (6) always occur, therefore, by using the worst values of those parameters, readout time of the hard drive can be assured. However, as the differences in the readout time based on reasons (3), (4) and (5) are unpredictable and irregularly occur, consideration should be required.

Those unpredictable differences in readout time are easily affected by temperature and humidity. Auxiliary storage is usually located in an air-conditioned computer room with computers; however, auxiliary storage for print servers tend to be located in the working office where the room temperature is easily changeable. Therefore, such irregular differences of the readout time will easily occur.

Readout time of the data of conventional parallel-controlled disk arrays is not assured neither. Since data is stored on respective disks being separated in the parallel controlled disk array, all disks are required to work together correctly in order to assure the readout time as expected. An irregular-occurring probability of the parallel controlled disk array, pA per unit time, which has number N single disks each of which has an irregular-occurring probability p per unit time, is defined by the following equation (4).

$$pA = 1 - (1-p)^N \qquad (4)$$

The irregular is defined as the lowering of the processing speed of the hard drive based on the recalibration or the errors. For example, as the thermal recalibration of the hard drive is generally executed in 10 or 20 minute intervals, if the parallel-controlled disk array has four disks, thermal recalibration of the disk array will be executed in 3 to 5 minute intervals, which is almost four times compared to that of a single disk. The thermal recalibration will also be induced into the irregular.

FIG. 20(b) is the data-transfer timing chart when the irregular occurs. In this figure, the time progress due to the irregular is expressed as seven time units. In this figure, the parallel-controlled disk array takes eight time units for data transfer because an irregular occurred at disk #2. Comparing to the data transfer rate of the single disk which takes eleven time units, the parallel-controlled disk array accelerates the data transfer only about 40 percent. Comparing to the data transfer rate when the irregular does not occur, the transfer rates are decreased to 1/2.8 (=4.0/11.0) in the case of single disk and to 1/8.0 (=1.0/8.0) in the case of parallel-controlled disk array, respectively. Therefore, irregulars affect the parallel controlled disk array much worse in the data transfer rate.

If such irregular occurs, blank papers might be outputted in the high speed printer or picture frames might be missed in the VOD system. To avoid such drawbacks, the data transfer rate of the hard drive should be assured as high as or more than the required transfer rate of the high speed printer or the VOD system. To assure the transfer rate, it might be possible to provide buffer memory for buffering the data and use the buffered data when the irregular occurs. However, to assure the high volume data transfer, a high volume buffer is needed.

For example, in the application that utilizes a high speed printer capable of printing one A4-size full-colored document (24 bits per dot, 400 dots per inch) per second, if the irregularity occurs for one second in maximum, the total size of the required buffer memory will be 50 MB because the data transfer from the disk array, which is generally 50 MB per second, will be stopped for one minute. Likewise, in the case of VOD, if there are fifty clients on the VOD system, the required buffer memory will be 62.5 MB (=10 Mbits per second for 1 second for 50 clients) Thus, to assure the data transfer by using the buffer memory, it requires tremendous amount of buffer memory.

In addition, if the system equips the high volume buffer memory, system response will be lowered. The system response is defined as the required time to start a service after the service requirement is received. In order to assure the data transfer rate, printing service or video providing service will not be started until the buffer memory is filled by the read data. For example, if the parallel-controlled disk array functions at the average data transfer rate of 70 MB per second, data transfer response time will be lowered by 0.7 second (50 MB/70 MB per second) in the case of high speed printer and by 0.9 second (62.5 MB/79 MB per sec) in the case of VOD system, respectively, compared to the system that has no buffer memory.

The above response-time delay was determined assuming that irregulars are not occurred in sequence. In the above case, once the irregular occurs, the buffer memory has to be filled by a read data again to assure the data transfer rate. In this case, the data transfer response time will be much lowered for 2.5 seconds (50 MB/(70 MB per second −50 MB per second)) in the case of high speed printer and for 8.3 seconds (62.5 MB/(70 MB per second −62.5 MB per second)) in the case of a VOD system. In this term, it is impossible to assure the data transfer rate using the read data.

The conditioned probability pi(t) of the occurring of another irregular within t seconds after a first irregular occurs is defined by the following equation:

$$pi(t) = 1 - \exp(-t/300) \qquad (5)$$

providing the probability process is the Poisson's process, the consequent time of the irregular is 1 second, irregular occurring at each disks are independent phenomena and the irregular occurring probability is the 1/300 (1 second per five minutes).

Actual conditioned probabilities of irregular occurrence in both cases of high speed printer and VOD system are determined as $8.3 \times 10^{-3}$ and $7 \times 10^{-2}$, respectively, by inputting the actual values of t=2.5 and t=8.3 into the equation (5), respectively.

Therefore, data provision will be interrupted due to occurrence of irregulars in sequence for one time per ten hours (=5 minutes/$8.3 \times 10^{-3}$) in the case of high speed printer and one time per three hours (=5 minutes/$2.7 \times 10^{-2}$) in the case of VOD system, respectively.

In the conventional parallel-controlled disk array, an irregular occurring probability will be high as the number of disks is increased in order to increase the data transfer rate. Therefore, to assure the data transfer rate, a high capacity buffer memory is required. However, the buffer memory induces the lowering of the system response time or increasing of the probability of interrupting of the data provision.

Therefore, conventional parallel-controlled disk array is not still applicable to the system that requires assurance of the data transfer rate.

SUMMARY OF THE INVENTION

The object of the present invention is to provide an auxiliary storage control method and control devices that assure the data transfer rate even when an irregular occurs by multiplying the data in multiple auxiliary storage (multiple disks) and reading the multiplied data from the auxiliary storage in parallel.

Another object of the present invention is to provide an auxiliary storage control device comprising a plurality of auxiliary storage units each of which stores the same data, a readout system for reading out said data from said plurality of auxiliary storage units simultaneously in response to a readout command, a detecting system for detecting an auxiliary storage unit in which the reading out of said data is finished at the earliest, a selecting system for selecting said data that is read from said detected auxiliary storage unit, an irregular detecting system for detecting an irregular auxiliary storage unit that is still working, and a readout prohibiting system for prohibiting a consecutive readout command against said irregular auxiliary storage unit.

Yet another object of the present invention is to provide an additional feature to assure the data transferring rate even when an irregular occurs in auxiliary storage units.

DESCRIPTION OF THE DRAWINGS

FIGS. 19(a) through (e) are explanatory views of the reading data transfer both of the present invention and the prior art in a normal condition.

FIGS. 20(a) through (e) are explanatory views of the reading data transfer both of the present invention and the prior art when the irregular occurs.

DETAILED DESCRIPTION OF PREFERRED EMBODIMENTS

Figure 1:
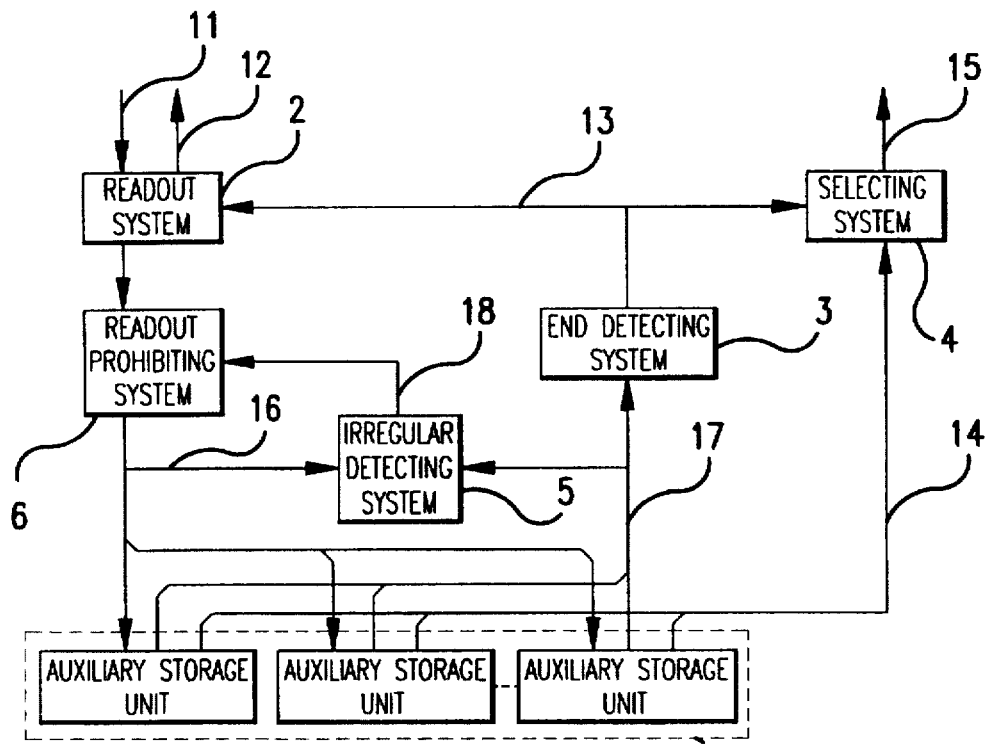
FIG. 1 is a schematic drawing of the first embodiment of the present invention.

As indicated in FIG. 1, this invention includes plural auxiliary storage units #1 through #N each of which stores the same data, a readout system 2 for reading out the stored data from the plural auxiliary storage units simultaneously in response to a readout command, an end detecting system 3 for detecting a finished auxiliary storage unit in which the reading out of the data by the readout system 2 is finished at the earliest, a selecting system 4 for selecting the data which is read from the finished auxiliary storage unit detected by the end detected system 3, an irregular detecting system 5 for detecting an irregular auxiliary storage unit, and a readout prohibiting system for prohibiting a consecutive readout command against the irregular auxiliary storage unit detected by the irregular detecting system 5. The plural auxiliary storage units #1 through #N are indicated as numeral 1 as a whole.

In this configuration, the readout system 2 issues a readout command to the plural auxiliary storage units when a readout command is inputted from the host (not shown) through the input line 11 and notifies the end of process to the host (not shown) through the output line 12 when the readout is finished. The end detecting system 3 is able to detect the end timing of the readout of the data of each auxiliary storage unit, and if the end detecting system 3 detects the auxiliary storage unit in which the data readout is finished at the earliest, the finished auxiliary storage unit is notified to both the readout system 2 and the selecting system 4. The selecting system 4 outputs the data through the output line 15. The data is outputted from the selected auxiliary storage through the output line 4.

The irregular detecting system 5 is notified of the auxiliary storage unit which issued the readout command from the readout system 2 through the input line 16, and is also notified of the finished auxiliary storage unit from the auxiliary storage units through the output line 17. The irregular detecting system 5 detects the auxiliary storage units in which an irregular has occurred by using internal information (for example, time and transferring amount of the data) and notifies the irregular auxiliary storage unit to the readout prohibiting system 6 through the input line 18. The readout prohibiting system 6 prohibits the issuing of the consecutive readout command to the irregular auxiliary storage based on the notification from the irregular detecting system 5.

Therefore, according to this configuration, even when an irregular occurs in any one of the auxiliary storage units, the readout data which was read from a regular auxiliary storage unit is always utilized. The irregular auxiliary storage is controlled so as not to execute any consecutive readout command while the irregular is happening.

Figure 2:
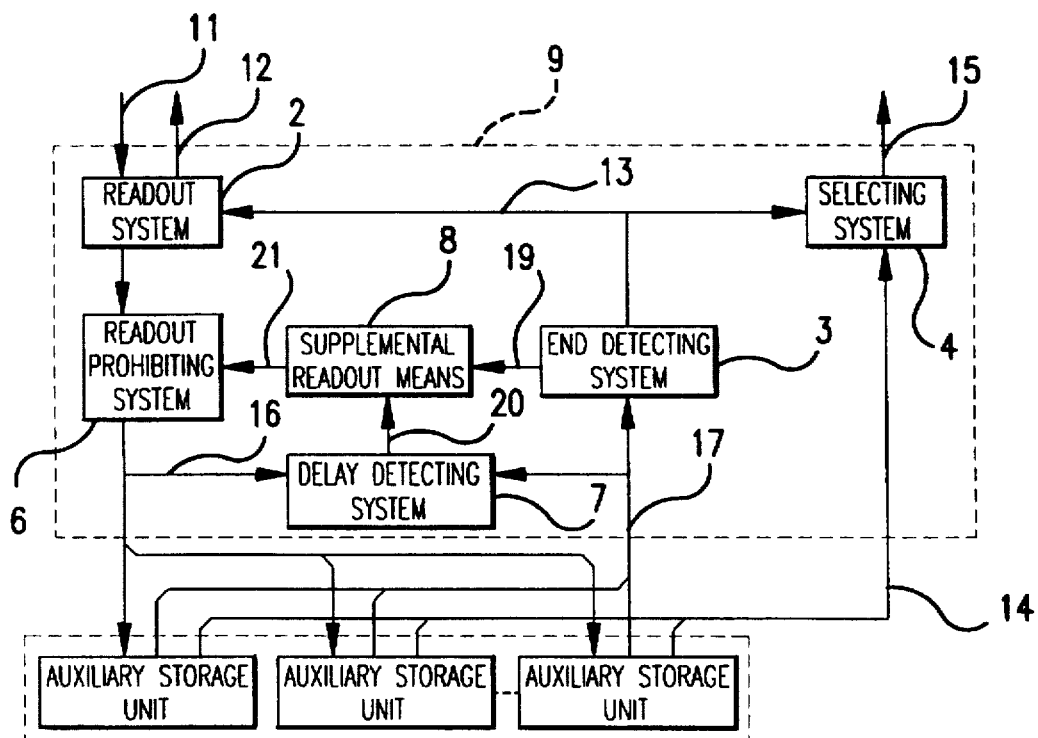
FIG. 2 is a schematic drawing of the second embodiment of the present invention.

Furthermore, as indicated in FIG. 2, the present invention also includes plural auxiliary storage units #1 through #N, each of which stores the same data in a divided form in plural data blocks, a readout system 2 for reading out said data from said plurality of auxiliary storage units by equal blocks with no overlapping of the data, a delay detecting system 7 for detecting an auxiliary storage unit in which the readout of the data is delaying, an end detecting system 3 for detecting a finished auxiliary storage unit in which the reading out of said data has already finished, and a supplemental readout means 8 for supplementally reading a data block, in which a readout from said delay ed auxiliary storage unit i s delayed, from said finished auxiliary storage unit which is detected by the end detecting system 3. In this configuration, compared to the embodiment of FIG. 1, the irregular detecting system 5 is eliminated from the configuration and the delay detecting system 7 and supplemental readout system 8 are newly added.

In this configuration, the readout system 2 issues a readout command to the plural auxiliary storage units when a readout command is inputted from the host (not shown) through the input line 11 and notifies the end of process to the host (not shown) through the output line 12 when the readout is finished. The end detecting system 3 is able to detect the end of the readout of plural auxiliary storage units through the output line 17. If the system detects the end of a predetermined number of auxiliary storage units, the system notify the finished auxiliary storage units to the supplemental readout means 8 through the output line 19 and to the readout system 2 and selecting system 4 through the output line 13, respectively. The selecting system 4 outputs the transferred data through the output line 15, which data was transferred through the output line 14, when the selecting system receives the end notices.

Delay detecting system 7 is notified of the auxiliary storage units to be readout from the readout prohibiting means 6 through the input line 16 and notified of the end of readout from the auxiliary storage units through the output line 17. The delay detecting system 7 detects the delayed auxiliary storage unit by internal information (for example time and amount of transferred data) and notifies the delayed auxiliary storage, unit to the readout prohibiting means 6 through the output line 20, supplemental readout system 8 and output line 21. The readout prohibiting system 6 is controlled so as not to issue any consecutive readout command to the delayed auxiliary storage units. The supplemental readout system 8 determines the auxiliary storage units in which the data should be readout supplementally based on the notice s from the delayed detecting system 7 and the end detecting system 3 and executes the supplemental readout. Therefore, according to the present configuration, if the delay occurs on a specific auxiliary storage unit based on the irregular, the device reads the same data from another normal auxiliary storage unit supplementally. The delayed auxiliary storage unit is controlled so as not to execute any consecutive readout command while the irregular is occurring.

Figure 3:
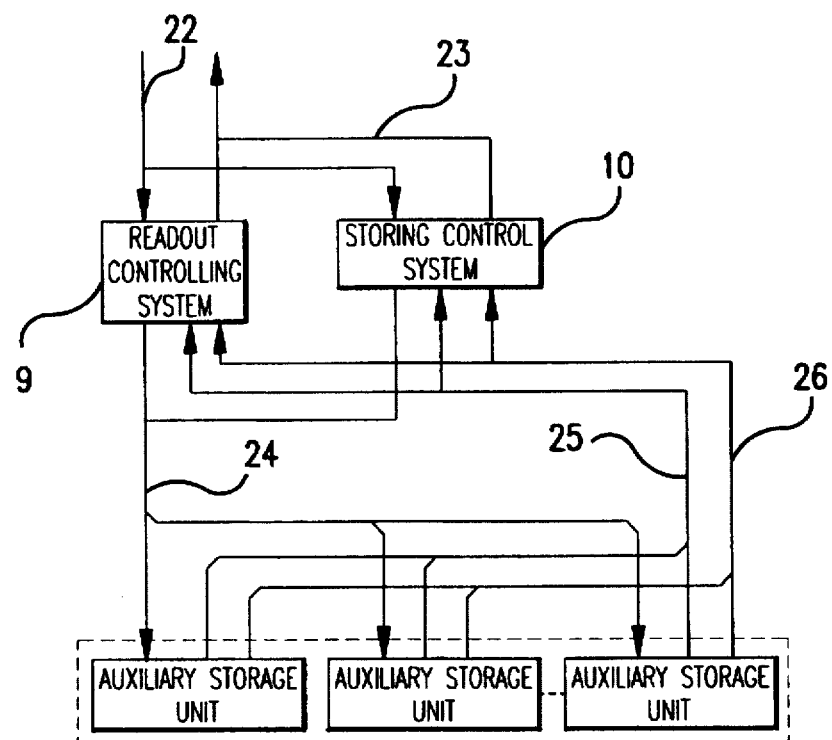
FIG. 3 is a schematic drawing of the third embodiment of the present invention.

As disclosed in FIG. 3, this invention may also include the readout control system 9 and the storing control system 10. The readout control system 9 is constituted from the readout control system 2, end detecting system 3, selecting system 4, read prohibiting system 6, delay detecting system 7 and the supplemental readout system 8. The readout address is directed by the stored address, which is controlled by the storing control system 10. The storing control system 10 comprises a first storing system for storing the data being divided on specific addresses of separated auxiliary storage units and a second storing system for storing the same data being divided on another specific address of separated auxiliary storage units.

In this configuration, the readout control system 9 and the storing control system are directed to conduct the readout or the storing processes by a host (not shown) through the input line 22. The readout controlling system 9 and the storing controlling system 10 also notify the end of readout or the end of storing to the host through the output line 23. The readout command and storing command including actual data are outputted to the auxiliary storage units from the readout controlling system 9 and the storing controlling system 10, respectively, through the output line 24. The data and notice from the auxiliary storage units are inputted into the readout control system 9 and storing control system 10 through the output lines 25 and 26, respectively. The data storing is done by cooperation of the first data storing system and second data storing system. If the first data storing system is controlled so as to store the data only into high-speed accessible addresses of each auxiliary storage unit in divided form, then the high-speed accessible addresses are also utilized in the readout process unless an irregular occurs in the specific auxiliary storage unit.

Figure 4:
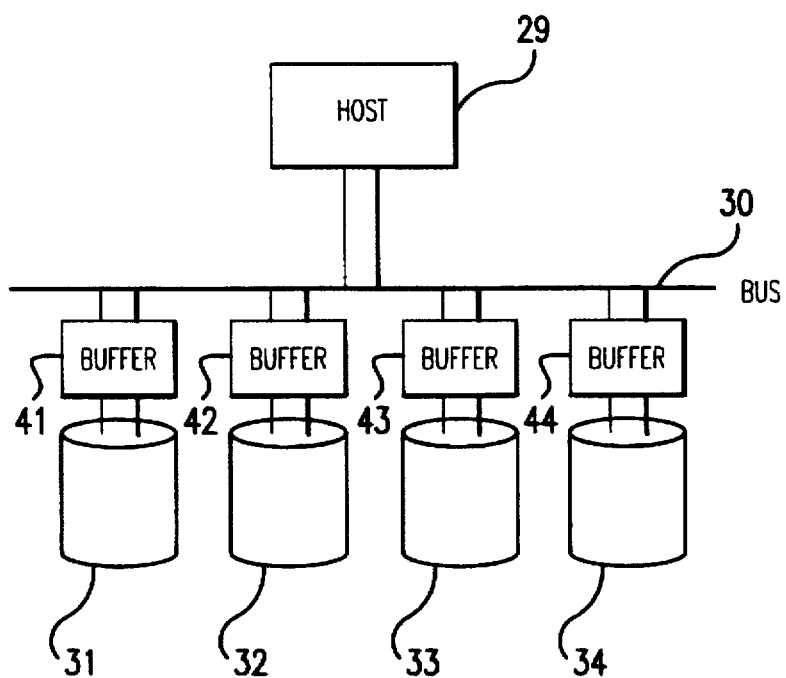
FIG. 4 is a schematic drawing of the system utilizing the first embodiment of the present invention.

The first embodiment of the present invention will be explained by using FIG. 1, FIG. 4 through FIG. 10, FIG. 19(c) and FIG. 20(c). In FIG. 4, 29 is the host computer (Host), 30 is the peripheral bus (Bus), 31 through 34 are the disk #1 through #4 as auxiliary storage units; and 41 through 44 are buffer memories #1 through #4 corresponding to disk #1 through #4, respectively. The host 29, buffer memories #1 trough #4, and disks #1 through #4 are connected with each other through the bus 30. In this embodiment, the host constitutes an auxiliary storage controller, which includes the readout means 2, the end detecting means 3, the selecting means 4, the irregular detecting means 5 and the prohibiting means 6 for readout, and the host executes readout of the data from and write of the data to buffer memories #1 through #4, and reads the data from and writes the data to disks #1 through #4 via the bus 30.

Buffer memories #1 through #4 are used as storage of readout data from and write data to disks #1 through #4 controlled by the host 29. Buffer memories #1 trough #4 are typically built in for 0.5 MB to 1 MB in the hard drive product and are indicated as independent components in FIG. 4 for the purpose of this explanation. It is preferred that the disks #1 through #4 are of the same type; however, some of them may be replaced with faster ones in terms of enhancement of the readout time. In this embodiment, a total four disks are used; however, the number of disks is not critical as long as there are plural disks.

Figure 5:
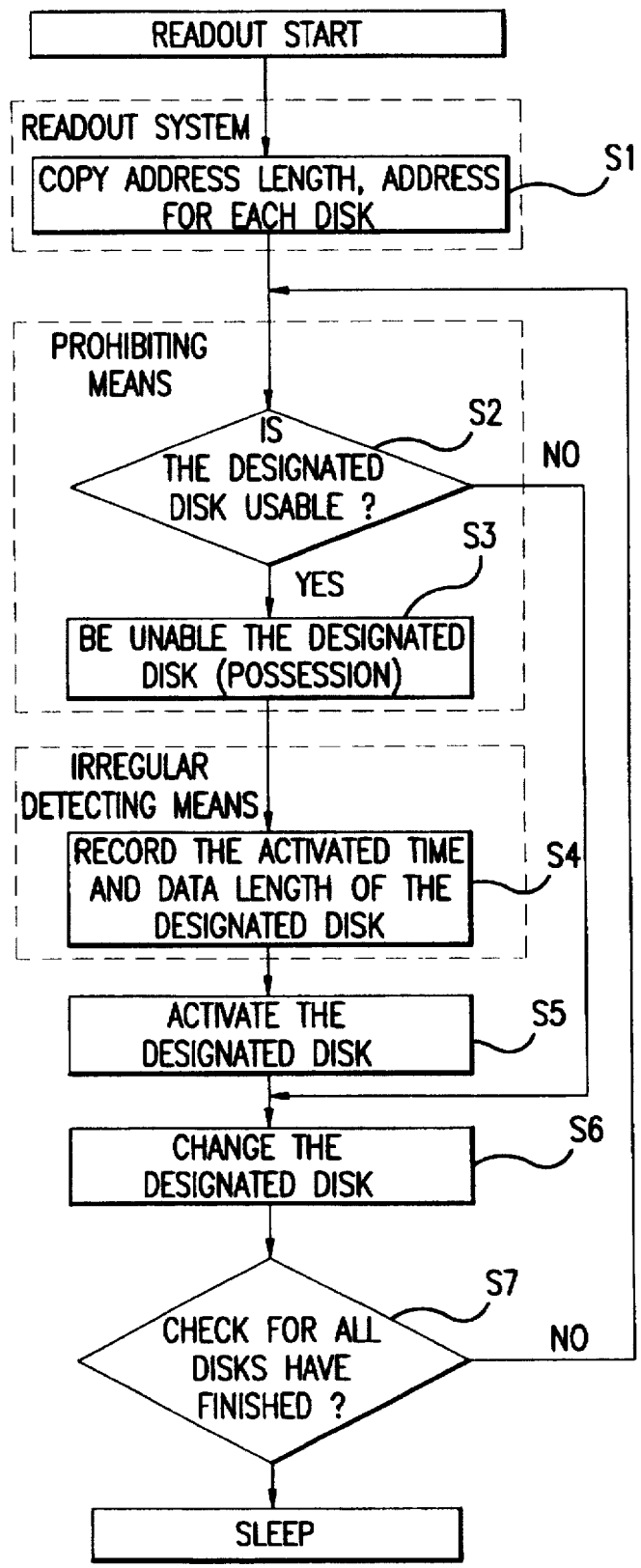
FIG. 5 is a flowchart indicating the read out process of the data.

The readout process according to the first embodiment of the present invention will be explained by referring to FIG. 1, FIG. 5 and FIG. 6. At first, the readout means 2 prepares plural commands to be issued for each of disks #1 through #4 (STEP 1), then the following steps will be conducted for each disk. The prohibiting means 6 checks whether the designated auxiliary storage unit(disk) is able to be used or not before issuing the command to the disk (STEP 2). The auxiliary storage unit (disk) is set usable in an initial condition of the device.

If the designated auxiliary storage is able to be used, the prohibiting means 6 possesses the auxiliary storage unit by changing an internal flag from usable to unusable (STEP 3), then notifies contents of the command to the irregular detecting means 5 (STEP 4) and actuates the auxiliary storage unit by issuing the command thereto (STEP 5). The irregular detecting means 5 stores the actuating time and the total amount of the transferring data of the auxiliary storage unit (STEP 4). Then, the readout means 2 changes the designation of the auxiliary storage (STEP 6). The above steps 2 through 5 are repeated for each designated auxiliary storage unit (disk). When the repeating process is finished for each designated auxiliary storage unit (disk), the readout process is temporarily finished (STEP 7) and is dormant for waiting an interrupt signal of the finishing of the readout process from the designated auxiliary storage unit (disk).

Figure 6:
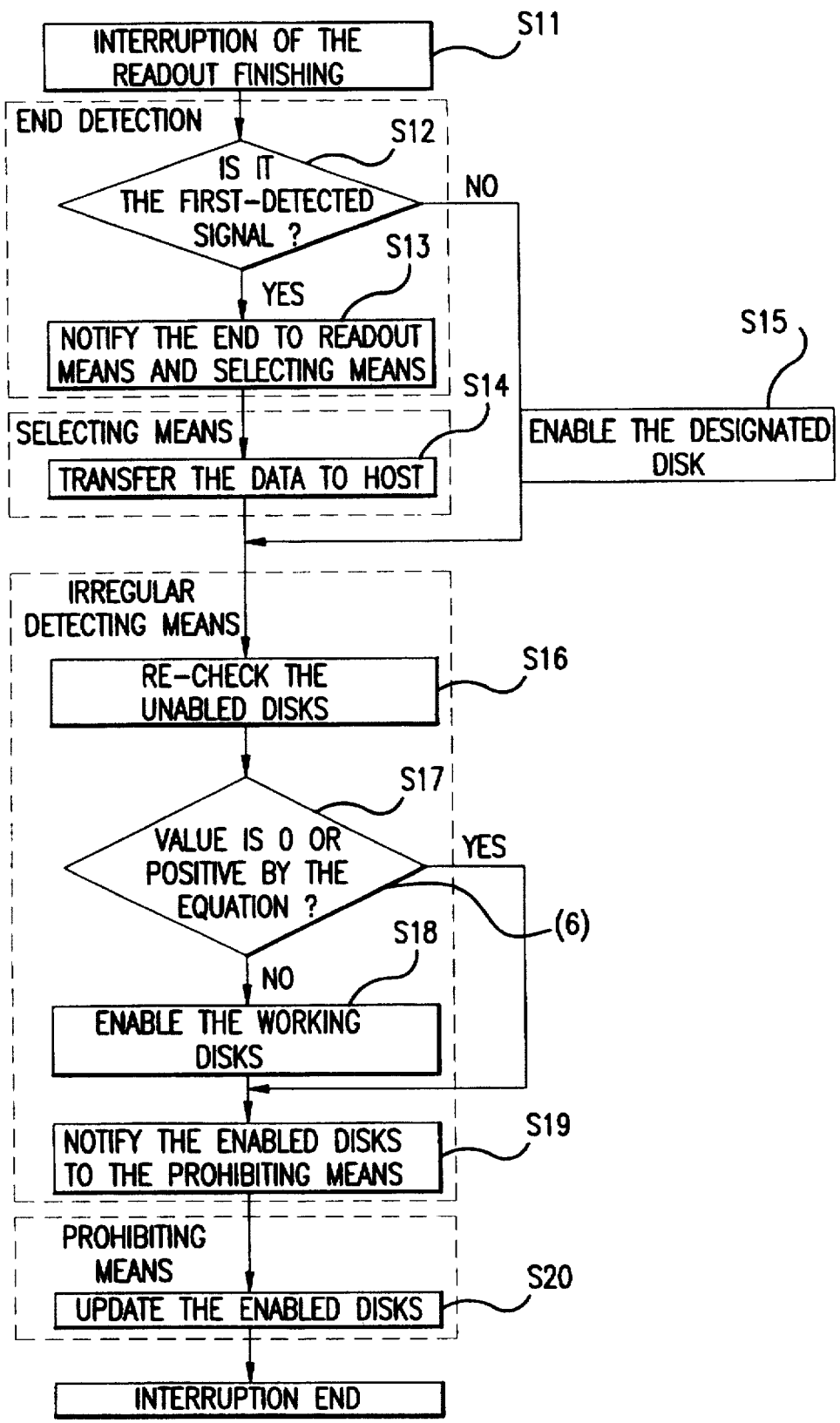
FIG. 6 is a flowchart indicating the interrupting command process.

As indicated in FIG. 6, if the interrupt signal of the finishing of the readout process is detected (STEP 11), the end detecting means 3 checks whether the detected signal from the specific auxiliary storage unit is the first-detected interrupt signal or not among the interrupt signals corresponding to each auxiliary storage unit based on the same readout command (STEP 12). If the detected signal is the first-detected interrupt signal, the end detecting means 3 notifies the end of readout to the readout means 2 and the selecting means 4 (STEP 13) and makes the selecting means 4 to transfer the readout data that is read from the auxiliary storage unit that issued the first-detected interrupt signal, to the host (STEP 14). If the detected signal is not the first-detected interrupt signal, since the readout data has already been transferred to the host, the internal flag of the auxiliary storage unit that issued the non first-detected interrupt signal are changed to a usable state because those auxiliary storage units do not have to be possessed anymore (STEP 11).

Figure 7:
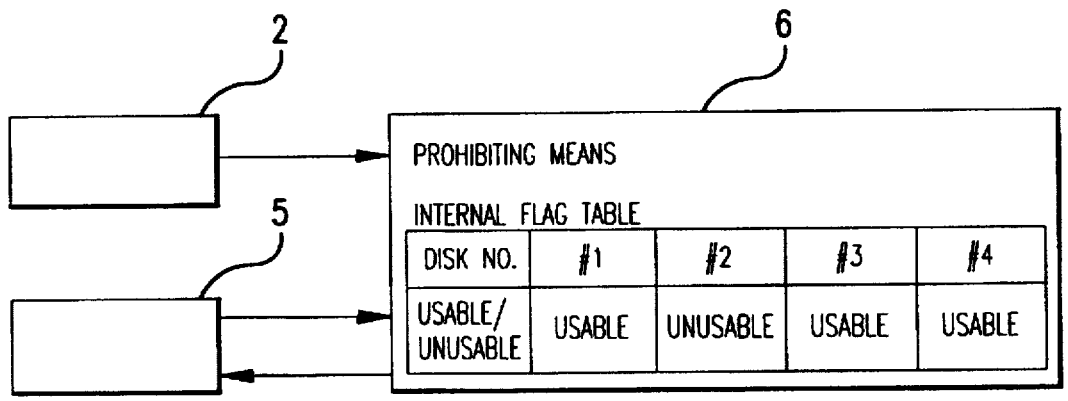
FIG. 7 is an explanatory drawing of the internal flag of the readout prohibiting means.

After the steps 14 and 15, the irregular detecting means 5 checks whether the possessed auxiliary storage units have turned to the usable state at this point by using the following equation (6) (STEP 16).

$$f(S,t)=S-Xt \quad (6)$$

wherein S is the amount of the transferred data at this timing, X is the worst data transferring rate in usual condition, and t is the elapsed time from the actuating of the auxiliary storage unit. In this equation, if the f (S, t) is a negative value, it is presumed that the data transfer is delaying due to an outstanding irregular. If the auxiliary storage unit (disk) has no outstanding irregular, the internal flag of the auxiliary storage unit (disk) is changed to usable (STEP 18), and the identification of the usable auxiliary storage (disk) is notified to the prohibiting means 6 (STEP 19). Then, the prohibiting means changes its internal flag corresponding to the newly usable auxiliary storage unit (disk) from unable to enable and finishes the readout process (STEP 20). The internal flags of the prohibiting means 6 are configured as an internal flag table as indicated in FIG. 7 and each flag indicates its states as enable state or unable state for each disks #1 through #4. The reason to manage each disk by those internal flags is that it is useless if the consecutive data is read from the disk having an outstanding irregular.

Figure 8:
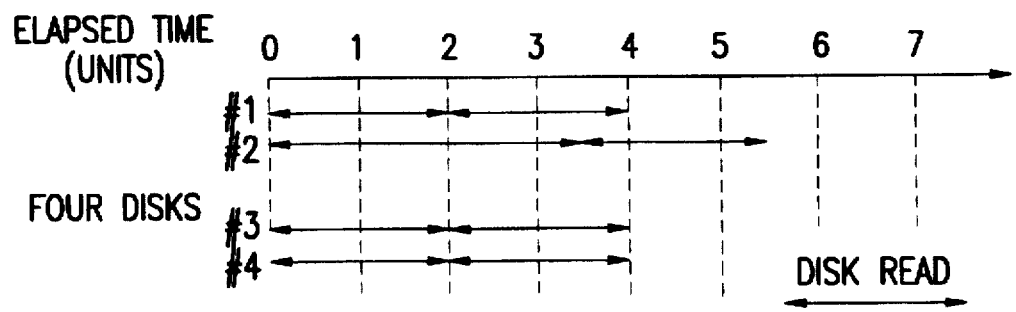
FIG. 8 is a timing chart indicating the data transfer process.

FIG. 8 discloses the processing timing of each of disks #1 through #4 as a timing chart. In the disk #2, if the first readout process is irregular and the second readout process is regular, the readout of the data by the second readout process will not be done in time unless another irregular also occurs on other disks. The irregular detecting means 5 detects such conditions by using the equation (6) and the prohibiting means 6 updates its internal flags in response to the detection of such conditions.

The reason why the auxiliary storage unit in which the readout is not finished is set to the usable state at the step 18, is to execute efficient readout consecutively. In other words, since readout from other disks is considered as not yet finished, when the readout from the first disk is finished, the consecutive readout process has to be done by using only this finished disk. Generally, when the readout process from the first one disk is finished, it is also highly presumed that the readout process from the other disks is in an almost finished state. Therefore, the auxiliary storage units considered that the readout process have almost finished are set to be usable state in order to use the auxiliary storage unit in the consecutive readout process. This avoids the readout process from using only one auxiliary storage in the consecutive readout process.

Figure 9:
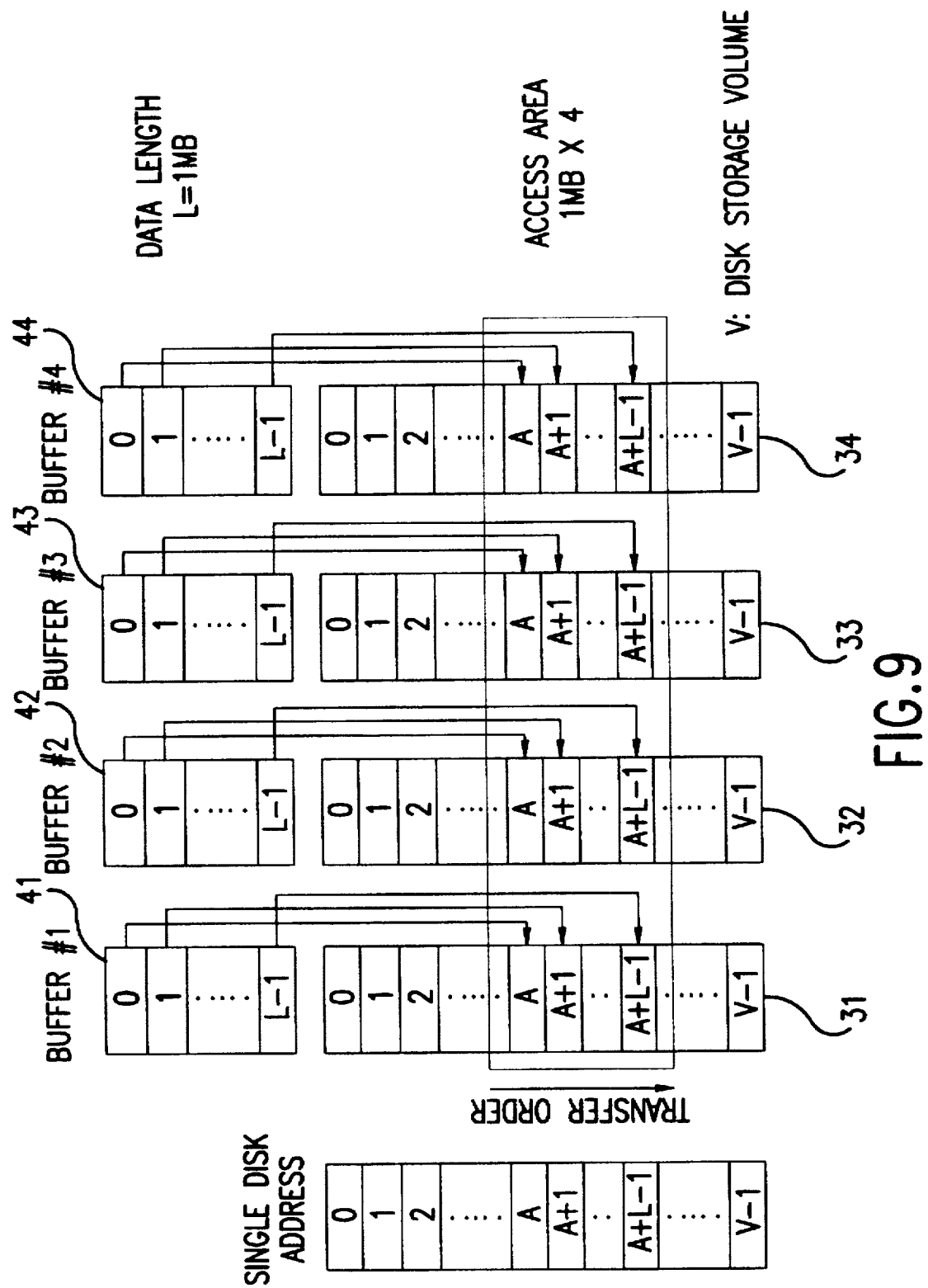
FIG. 9 is an explanatory drawing of the writing data transfer of the first embodiment of the present invention.
Figure 10:
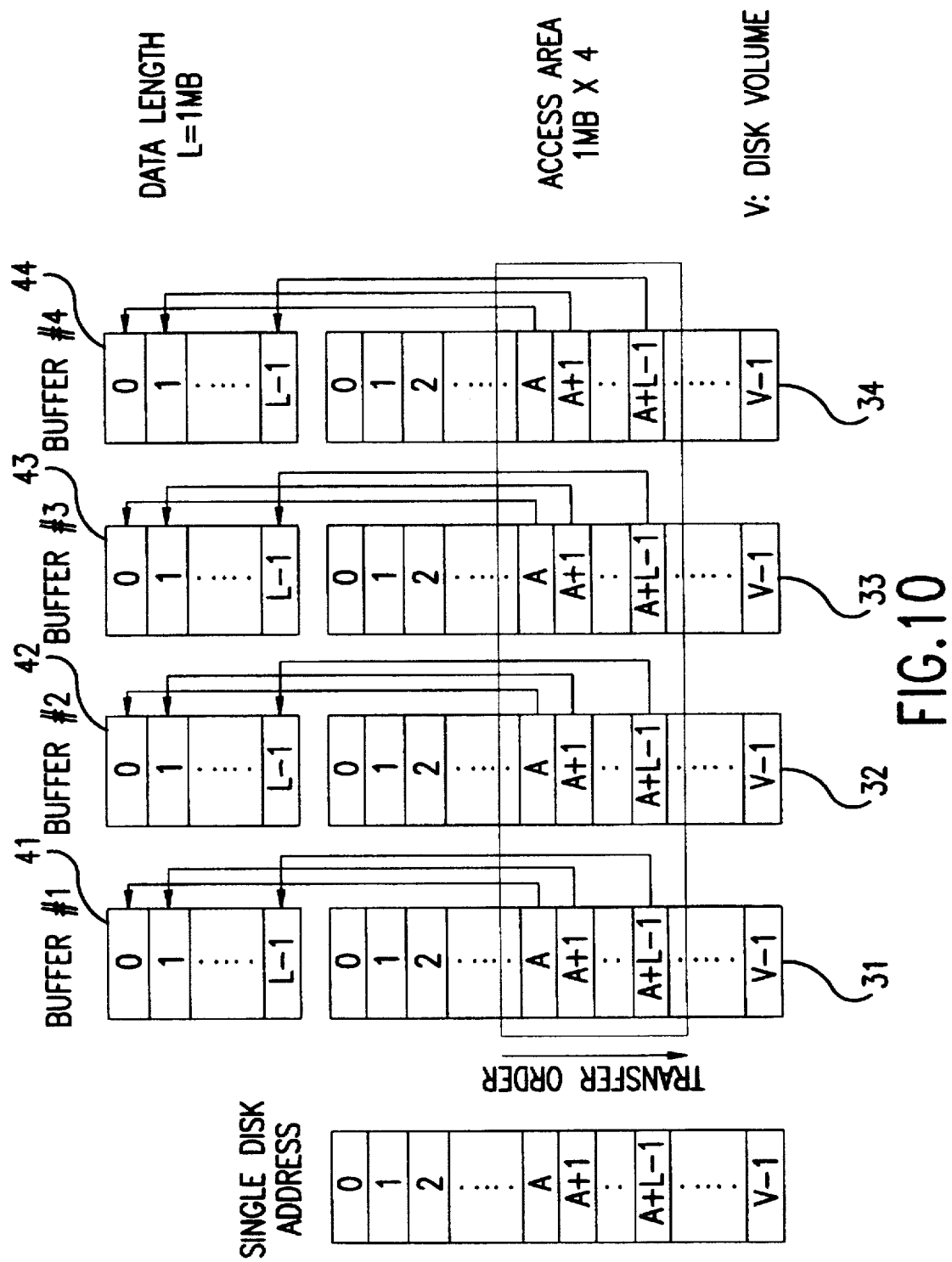
FIG. 10 is an explanatory drawing of the reading data transfer of the first embodiment of the present invention.

The data storing process according to the present invention will be explained by referring to FIG. 9 and the data readout process will be explained by referring to FIG. 10. In the data storing process, the host 29 determines both the disk address A and data length L. The data length L is assumed as 1 MB, which is smaller in size than the size of buffer memories #1 through #4. Then, the disks #1 through #4 are activated to store the data. In this case, the storing data for each disk is the same. The same data is transferred and stored to each disk, then the storing process will be finished.

In the data readout process, the stored data in the disks #1 through #4 will be read. FIG. 10 discloses the relationship between the disk addresses and the buffer memory addresses when the stored data on the disks #1 through #4 are readout to the buffer memory #1 through #4, respectively, as indicated by an arrow. The numerals described within disk #1 through #4 in FIG. 10 are disc addresses. The same address numbers are created in different disks because the data is stored multiply in each disk. The numerals described within buffer memory #1 through #4 in FIG. 10 are the memory address where the data stored at corresponding numbered disk addresses (offset A) will be stored thereto, respectively. The unit disk address is the actual disk address of each disk when each disks is regarded as an independent disk. The order of the readout and the transfer of the data is indicated as an arrow in FIG. 10 (in address ascending order).

In this data readout process, firstly, the host 29 determines the disk address A and data length L. The readout is done by activating all of disks #1 through #4 and the data that has been read from the first-finished disk in the data transfer will be adopted. After the data transfer from the first-finished disk, the data readout process from other disks may be aborted if it is better for ensuring the data readout speed in order not to interrupt the consecutive readout process.

FIG. 19(c) and FIG. 20(c) disclose timing charts of the data transfer process in both cases when an irregular occurs and an irregular does not occur. FIG. 19(a) and FIG. 20(a) are the data transfer timing charts of the data transfer process in both cases when an irregular occurs and an irregular does not occur in the single disk, respectively. Comparing the data transfer timing between them, the data transfer rate of the present embodiment in a normal condition is almost the same as that of the single disk. However, the data transfer rate of the present embodiment in the irregular condition is four time units compare to eleven time units of the single disk. Therefore, 2.8 times (1.0/14.0)data transfer rate to that of the single disk can be obtained in the irregular case.

The irregular occurring probability per unit time as a whole of this device of this embodiment is calculated by the following equation provided that the number N of single disks, each of which has an irregular occurring probability of p, are used:

$$pT=p^N \quad (7)$$

Irregular of the apparatus as a whole occurs only when irregulars occur on all single disks. By equations (4) and (7), the relationship between the irregular occurring probability pA of the conventional disk and pT of the present embodiment are estimated as the following equation:

$$pT<p<pA \quad (8)$$

The second embodiment of the present invention will be explained by referring to FIG. 2, FIGS. 11 through 13, FIG. 19(d) and FIG. 20(d). This embodiment increases average readout time of the data up to the same level with that of the parallel-controlled disk array while assuring the average readout time of the data as well as that of the first embodiment.

Figure 11:
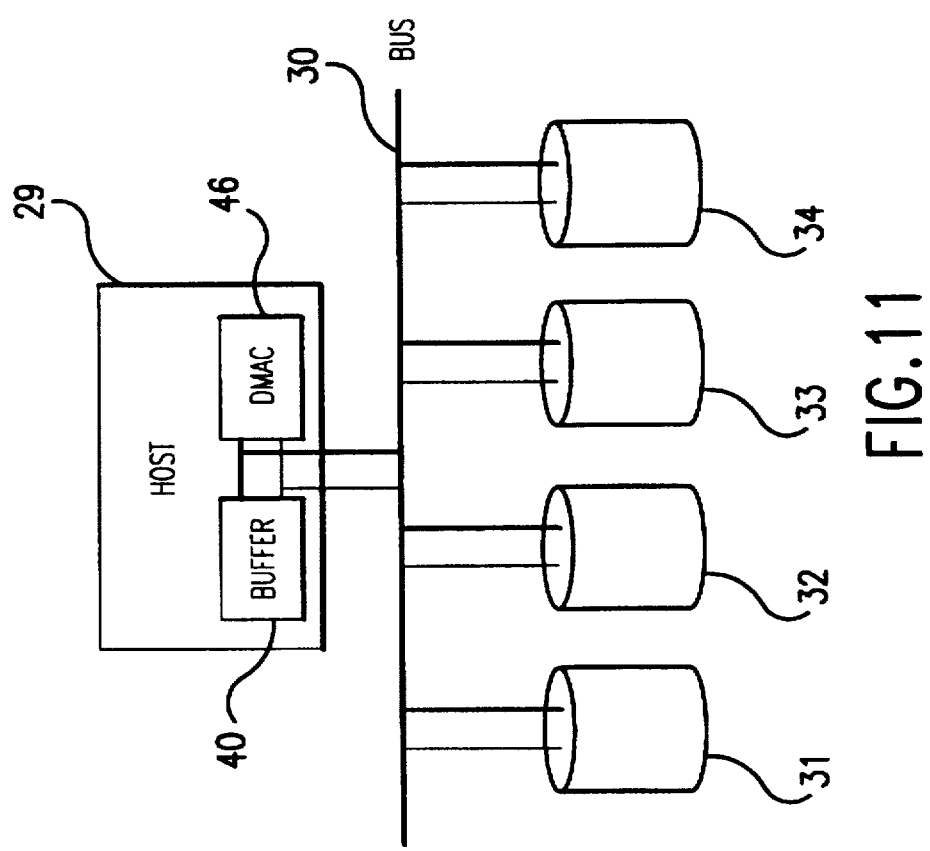
FIG. 11 is a schematic drawing of the system utilizing the second embodiment of the present invention.

As indicated in FIG. 11, the configuration of the hardware of the present embodiment is almost the same as that of the first embodiment. However, different from the first embodiment, the buffer memory 40 is rearranged from the disk to the host 29 and the DMAC 46 is used for the purpose of data transfer. The DMAC 46 has plural channels not less than a number of disks, for example not less than four channel in this example.

Figure 12:
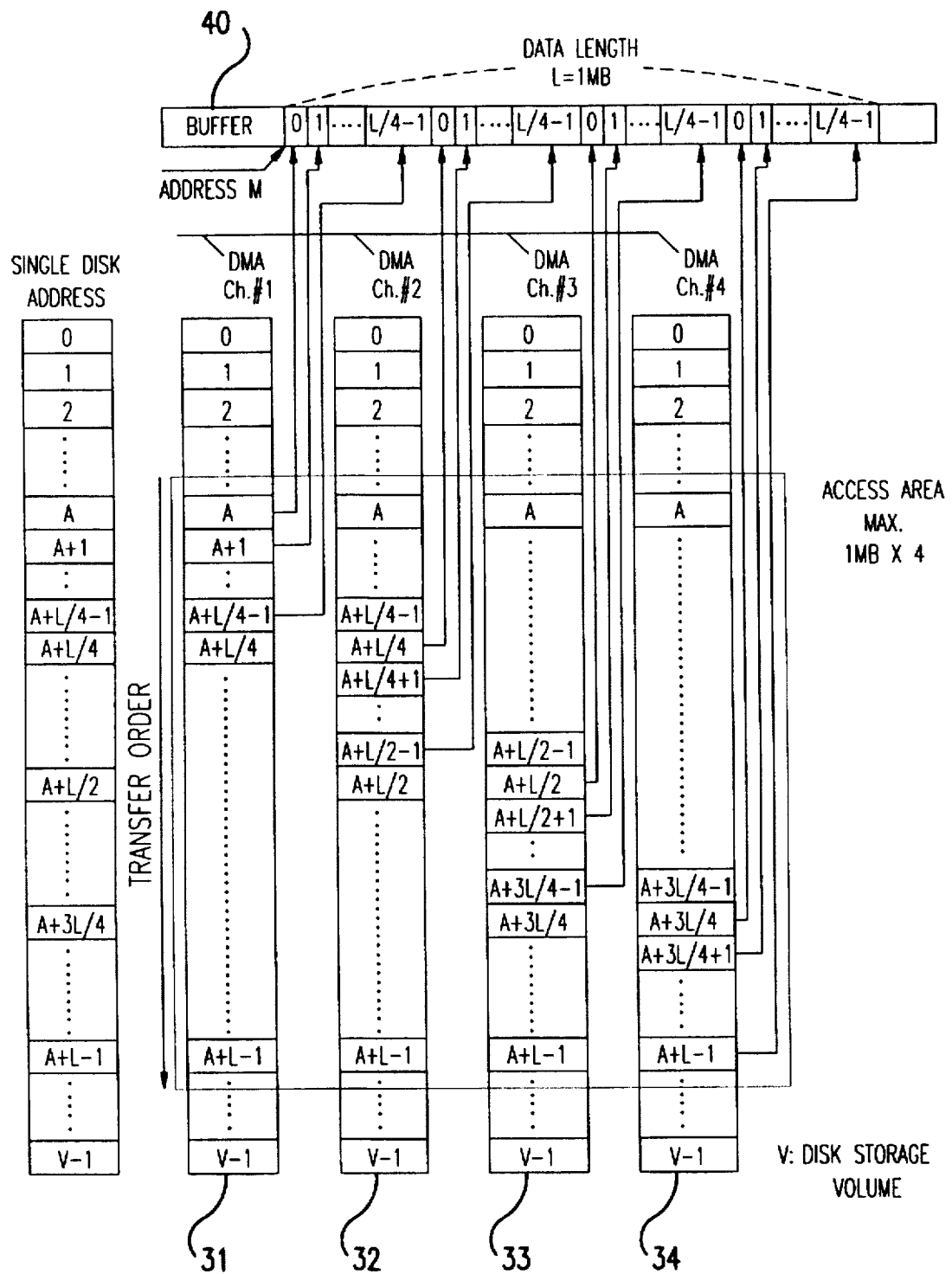
FIG. 12 is an explanatory drawing of the reading data transfer of the second embodiment of the present invention when the irregular is not occurred.

In this embodiment, since the data storing process is similar to that of the first embodiment, the data readout process with no irregular occurring and the data readout process with an irregular occurring will be explained by referring to FIG. 12 and FIG. 13, respectively. FIG. 12 discloses a relationship between the disk addresses and the memory addresses when the data is read from the disks #1 through #4 to the buffer memory 40. However, different from the case of FIG. 9, the total amount of buffer memory is set to be one quarter of that of the first embodiment and the beginning timing of the readout of the data from each disks is shifted by one quarter in the total data length, respectively. In this calculation of the quarter of the data length, any remainder is rounded up.

In a data storing process, the host 29 determines the disk address A and the data length L. At this time, the address and the data length are converted by the following equations:

$$Ai=A+(i-1)\cdot L/4$$

$$Li=L/4$$

Wherein, the Ai and Li are disk address and data length for Disk #i, respectively, and i=1, 2, 3, 4.

DMAC 46 is set to transfer the data from the address Ai to Ai+L/4−1 of the disk, to the buffer memory address of M+(i−1)·L/4. M is the offset of the buffer 40 and if the address is used from the first address, M will be 0. Then, all of the disks #1 through #4 and DMAC 46 are activated to start the readout process. The readout data is divided into four blocks and the read beginning addresses of each disk are each shifted for the length of the quarter of the total length of the data. The data is read from each of disks #1 through #4 in parallel by the block unit. Then the four pieces of data read from the disks #1 through #4 in parallel by the block unit are merged in the buffer memory. Therefore, the total amount of the readout data per unit time will be four times of that of the first embodiment. Thus, four times the data readout rate of the first embodiment is expected.

Since the above case is a no irregular case, the irregular case will be explained by referring to FIG. 13. FIG. 13 is the status after a certain time has elapsed from the status of FIG. 12 and the data readout from the disk #1 is finished and an irregular occurs during the readout from the disk #2. In the disk #3 and #4, no irregular occurs; however, the readout timings of both of those disks are delayed past that of the disk #1 and the amount of data until timing x and y are readout by that time, respectively. Whether an irregular occurs or not, in other word, the readout from the disk #2 is delayed or not, is determined by the delay detector 7. The host 29 can determine the delay by checking the data transfer counter of the DMAC 46. For example, as an evaluation equation whether the delay has happened or not, the following equation (9) can be used, $$f(S,t)=S-Xt+T \quad (9)$$

wherein S is the data transfer length obtained from the data transfer counter, X is the worst data transfer rate of the disk with no irregular, t is the elapsed time from the beginning of the data transfer, T is the constant value for considering an overhead of the head or the disk. X and Y should be determined as appropriate values by actual experiments. According to the equation (9), if the f (S, t) is zero or a positive value, it is determined that no irregular has occurred and if the f (S, t) is a negative value, it is determined that an irregular has occurred.

Figure 13:
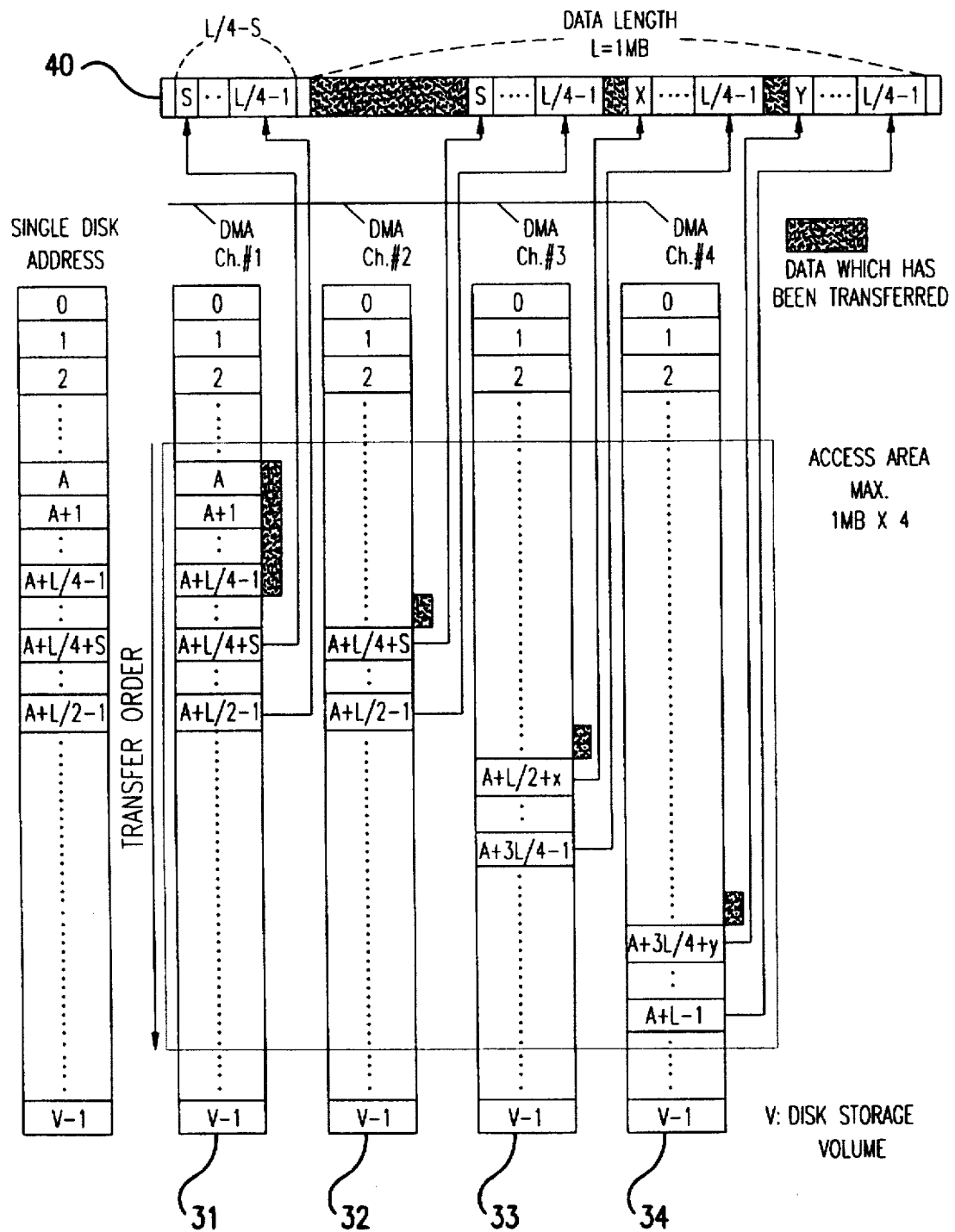
FIG. 13 is an explanatory drawing of the reading data transfer of the second embodiment of the present invention when the irregular is occurred.
Figure 14:
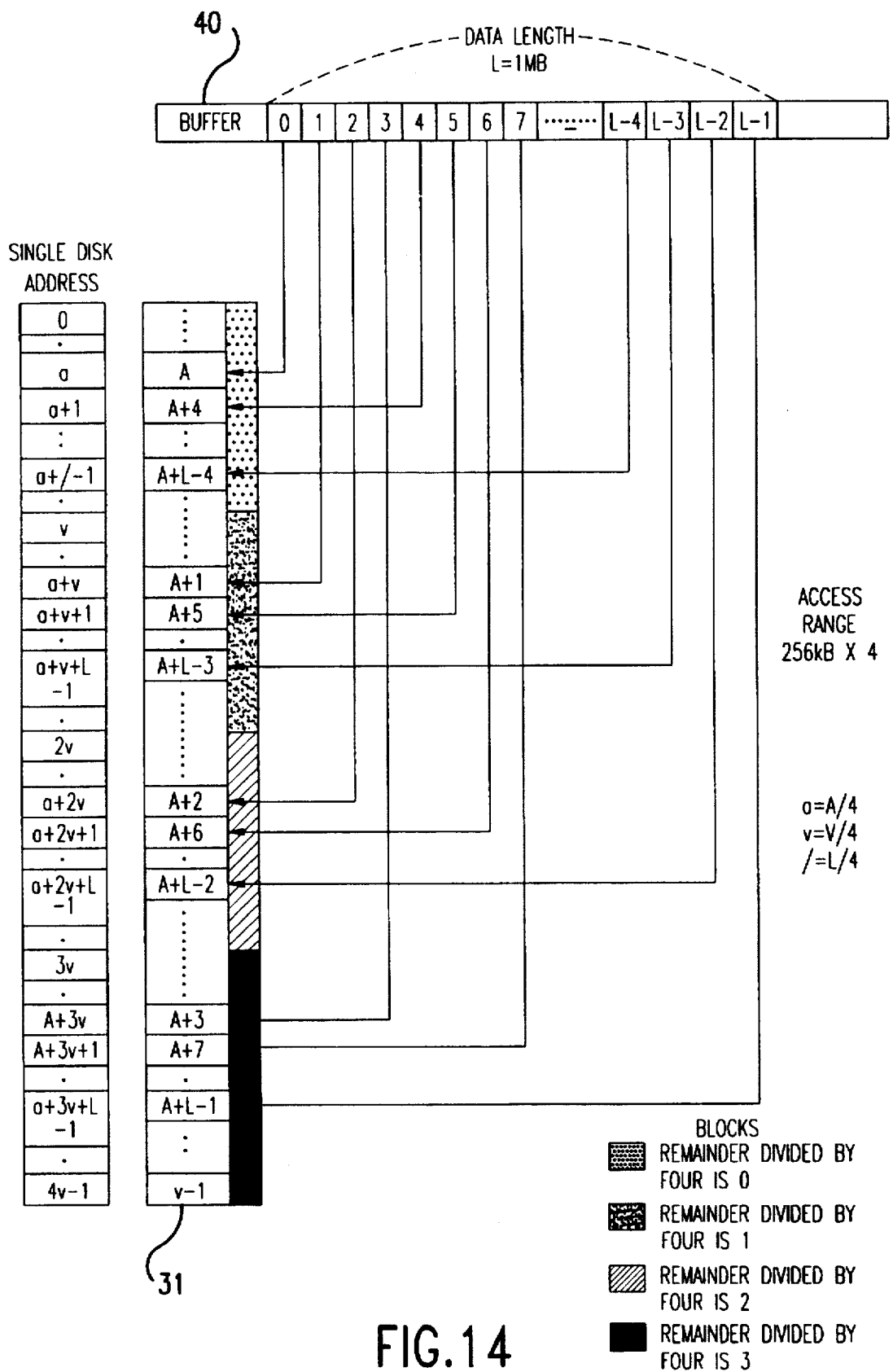
FIG. 14 is an explanatory view of the storing data transfer of the third embodiment of the present invention.
Figure 15:
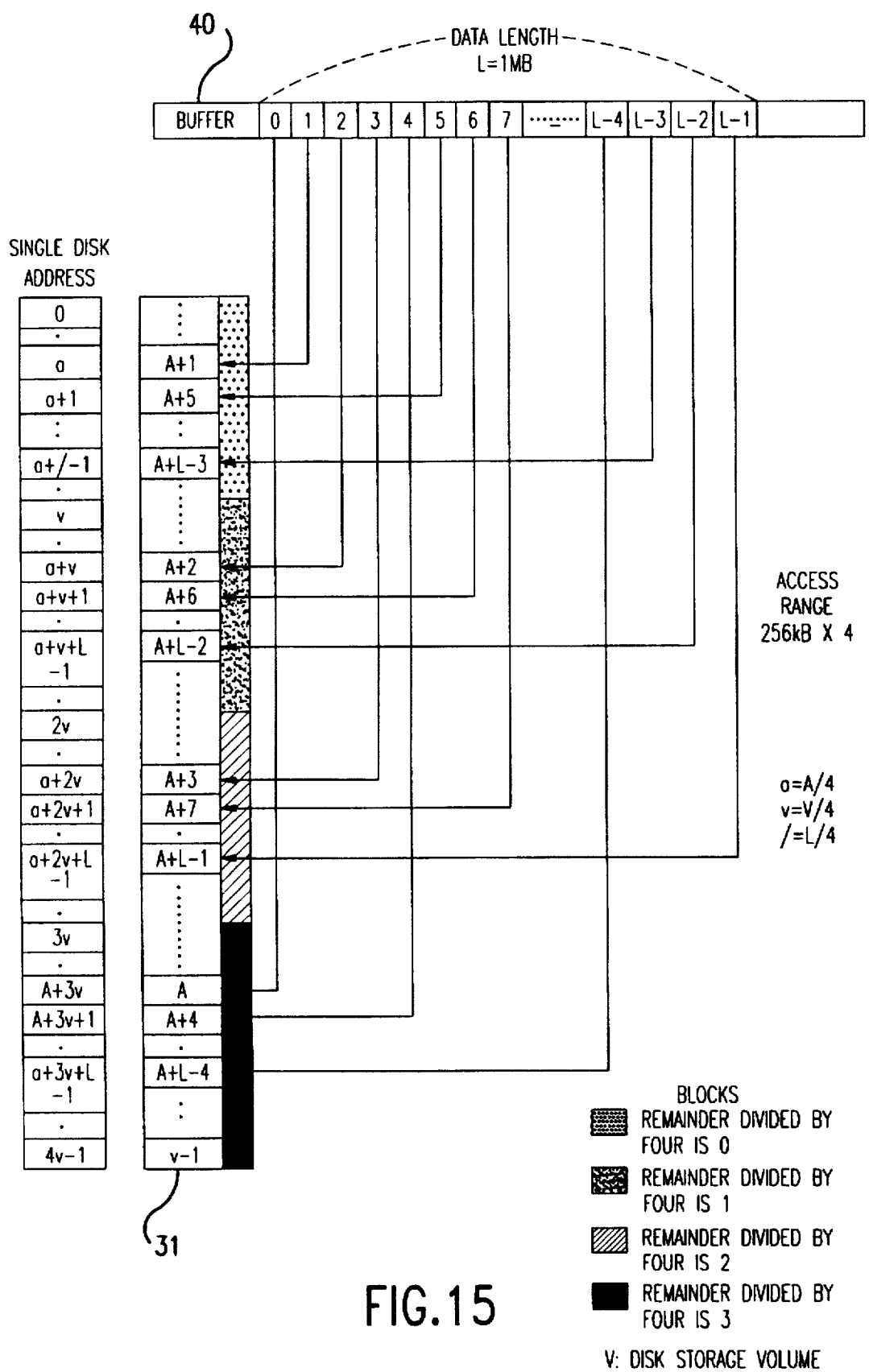
FIG. 15 is an explanatory view of the storing data transfer of the third embodiment of the present invention.
Figure 16:
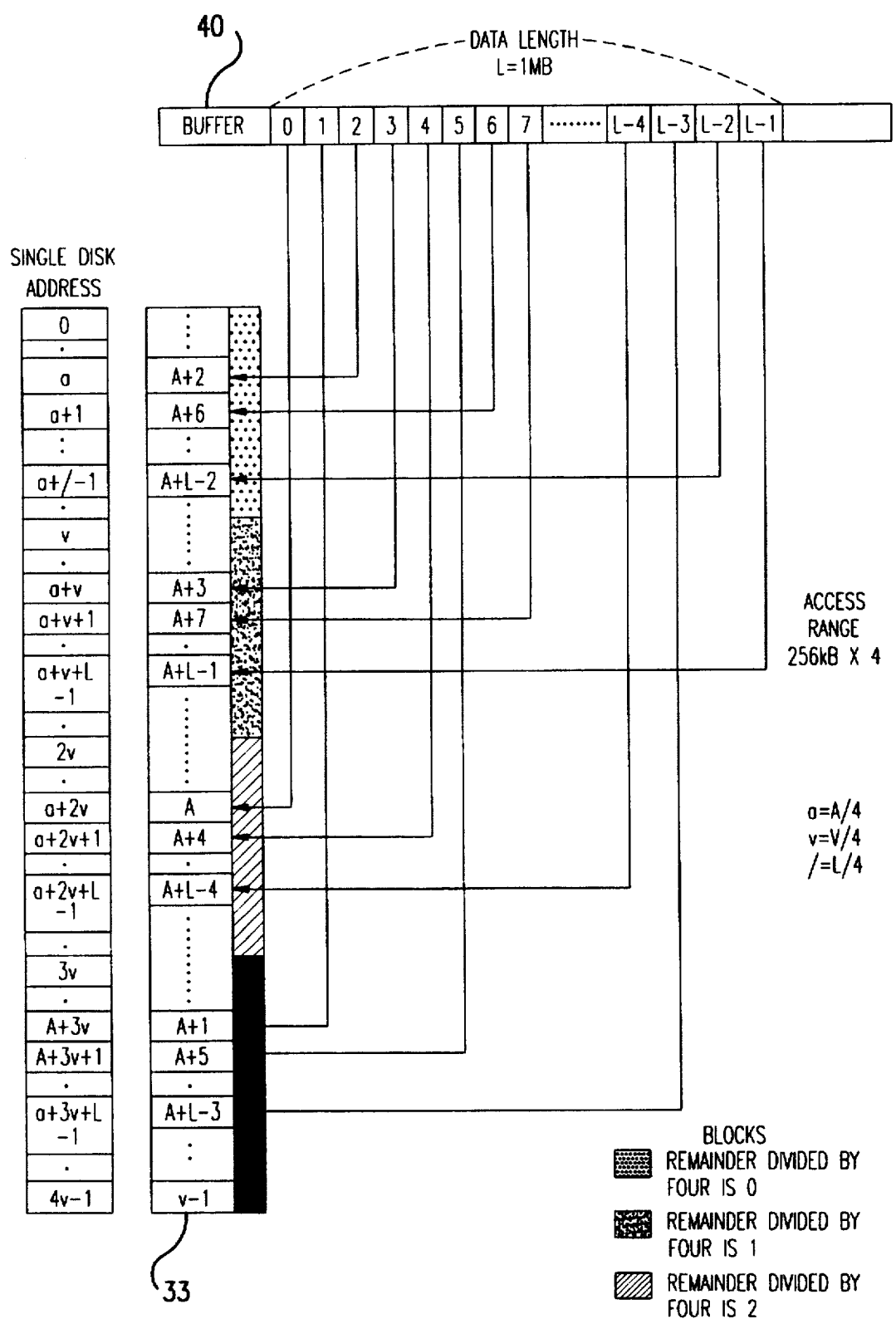
FIG. 16 is an explanatory view of the storing data transfer of the third embodiment of the present invention.
Figure 17:
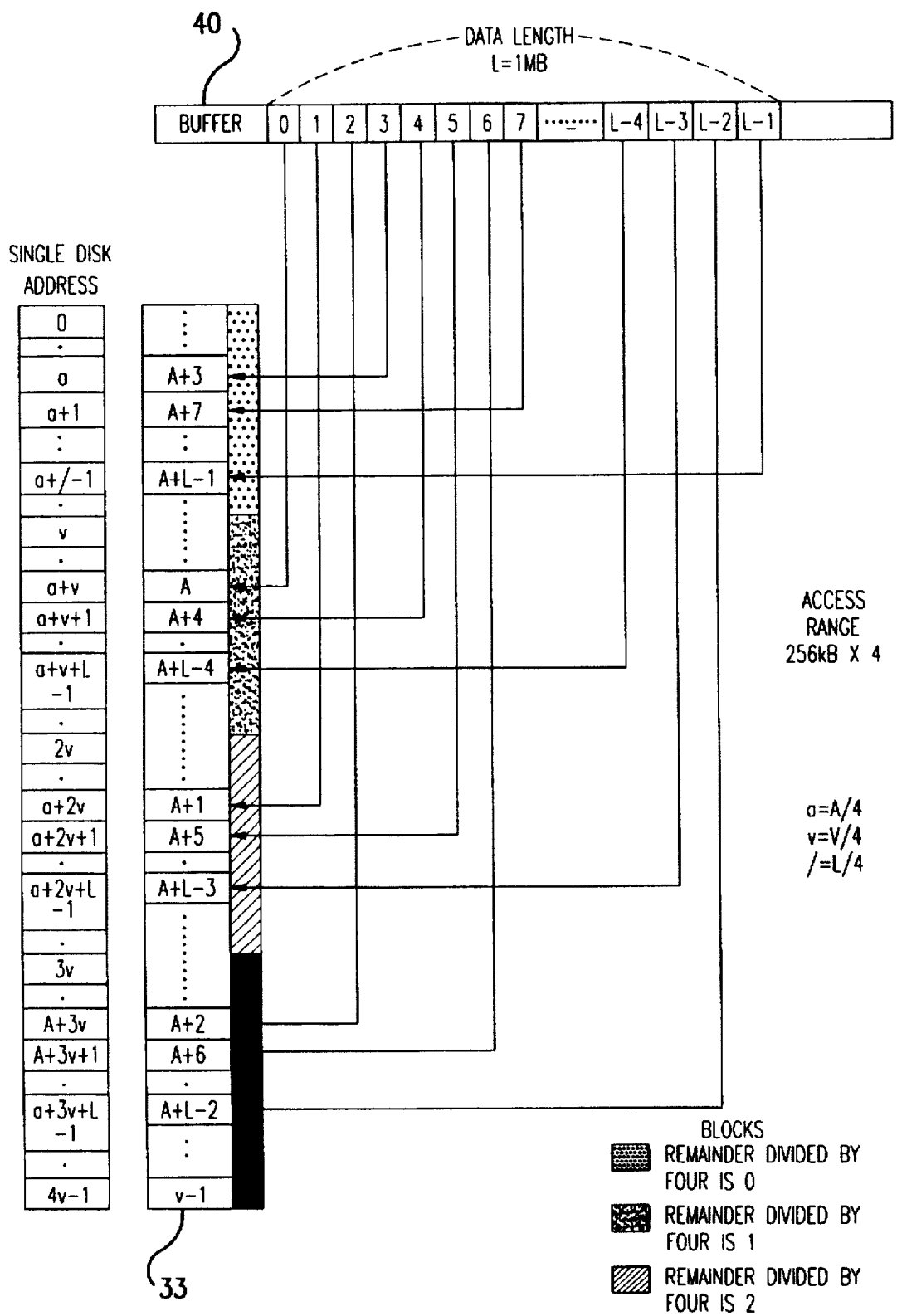
FIG. 17 is an explanatory view of the storing data transfer of the third embodiment of the present invention.

In FIG. 13, as the value f (S, t ) is negative for the disk #2, the supplement readout means 8 selects the disk #1, in which the data readout has already finished, as a readout source again instead of the disk #2 in which the irregular has occurred and reads the data that would have been read from the disk #2 from the disk #1. Up to this time, since the total readout amount of the data from the disk #2 is S, the same data is read from the disk #1 by assigning the data located at the reading address from A+L/4+S to A+L/2−1. The setting up of the buffer memory addresses, transfer addresses, data length and the DMAC 46 will be done by host 29.

The data to be transferred is temporarily stored in the buffer memory 40 by the selection means 4. The data to be used is the data transferred from the first-finished disk between the disk #1 and disk #2. When the data transfer either from the disk #1 or #2 is finished, data transfer from the other disks may also be aborted in order not to interrupt the consecutive readout process. If the data readout from the disk #1 is finished first, the selecting means 4 forces to quit the data transfer of the DMAC of disk #2, then the supplemental readout data from the disk #1 is copied to the address of the buffer memory where the data transferred from the disk #2 would have been stored. Thus, if an irregular occurs on one disk (disk #2), the data transfer is assured by the transfer of the same data from another disk (disk #1).

The timing charts of the data transferring for both when an irregular occurs and no irregular occurs are indicated in FIG. 19(d) and FIG. 20(d), respectively. In a normal condition, as the host 29 determined that all disks are working properly, the same results are obtained as with the conventional parallel-controlled disk array. On the other hand, in an irregular condition, the host 29 assigns disk #1 instead of disk #2, and the total readout time is finished within 1.5 time units. This is about 5.3 times (8.0/1.5) faster than that of the conventional parallel-controlled disk array as indicated in FIG. 20(b).

The third embodiment will be explained by referring to FIG. 3, FIG. 14 through FIG. 18, FIG. 19(e) and FIG. 20(e). The hardware configuration of the third embodiment is similar to that of the second embodiment. However, different from the second embodiment, the conversion equation from disk addresses issued by the host 29 into disk addresses that will be used by the readout and storing means is changed and the data selecting means 4 is also changed by the setting of the programming.

This embodiment is considered as the data multiplying method applied to the conventional parallel-controlled disk array. In FIG. 14 through FIG. 18, the same data is multiplied and stored in the same patterned portion in each of disks 31 through 34. In this example, the number of the multiplied disks is set to four; however, the number of disks is marginal.

The data configuration in the buffer memory and the disk and data transferring order when the data having a data length L(=1 MB) is stored to address A are disclosed in FIG. 14 through FIG. 17, each of which correspond to disk #1 through disk #4 (31 through 34). The unit disk address numbers in those figure are the unique disk address for each disk. The numbers of addresses described in the disk #1 through #4 (31 through 34) are the virtual addresses when the disks are assumed to be configured as one disk unit. The storing address section R as one disk unit and the address section Rij of disk #I, area #j (i, j are independently 1, 2, 3, 4) as each disk is defined by the following equations (10) and (11):

$$R = \{A, A+1, A+2, \ldots, A+L-1\} \quad (10)$$

$$R_{ij} = \{k \varepsilon R | k \equiv i - 1 + j - 1 \pmod{4}\}, R = \bigcup_{\substack{1 \leq i \leq 4 \\ 1 \leq j \leq 4}} R_{ij} \quad (11)$$

For example, the block having an aliquot address number by four as the one disk unit, is stored at the positions from beginning to ¼ in the disk #1, from ¼ to ½ in the disk #4, from ½ to ¾ in the disk #3 and from ¾ to end in the disk #4, respectively. The end of the storing process is, and which is different from the reading process, defined as the time for the storing process to all the areas of the disk #1 through #4 are finished. The storing to the disk #1 through #4 is preferably executed in parallel in terms of high storing speed; however, it may be done in order.

Figure 18:
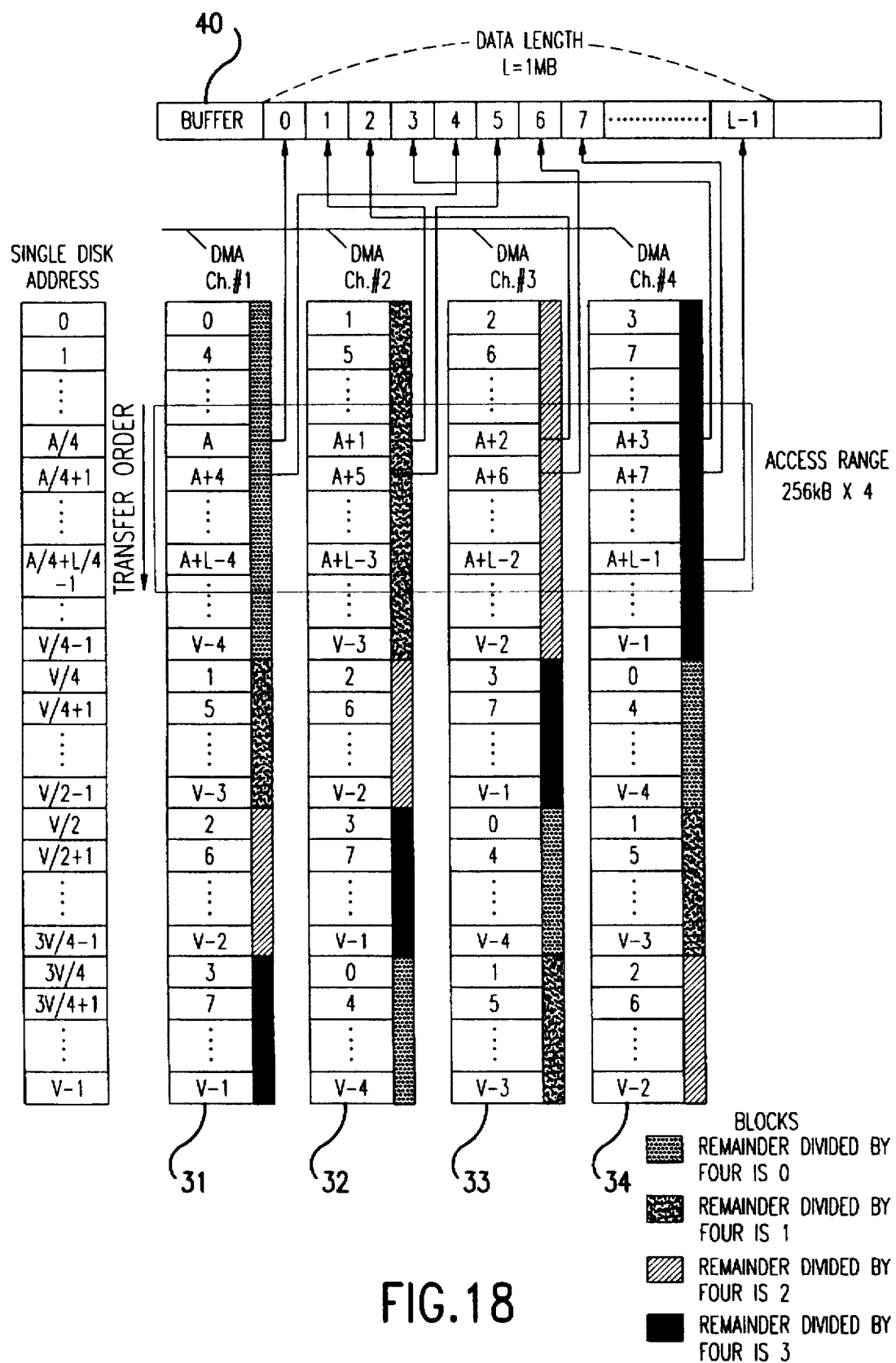
FIG. 18 is an explanatory view of the reading data transfer of the third embodiment of the present invention.
Figure 21:
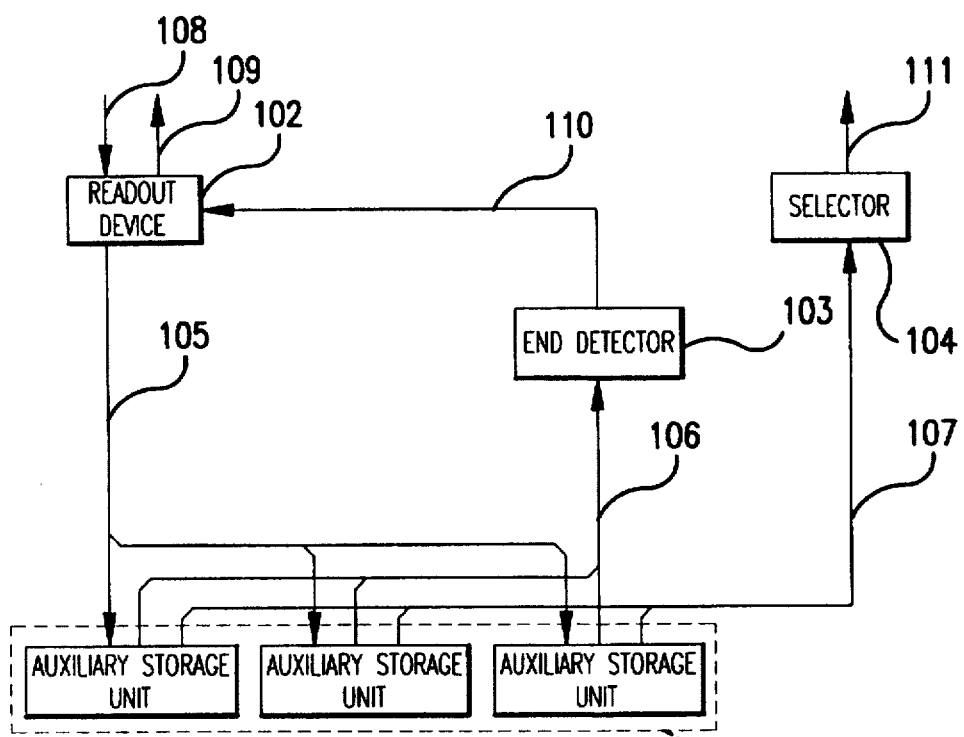
FIG. 21 is a structural view of the conventional auxiliary storage.
Figure 22:
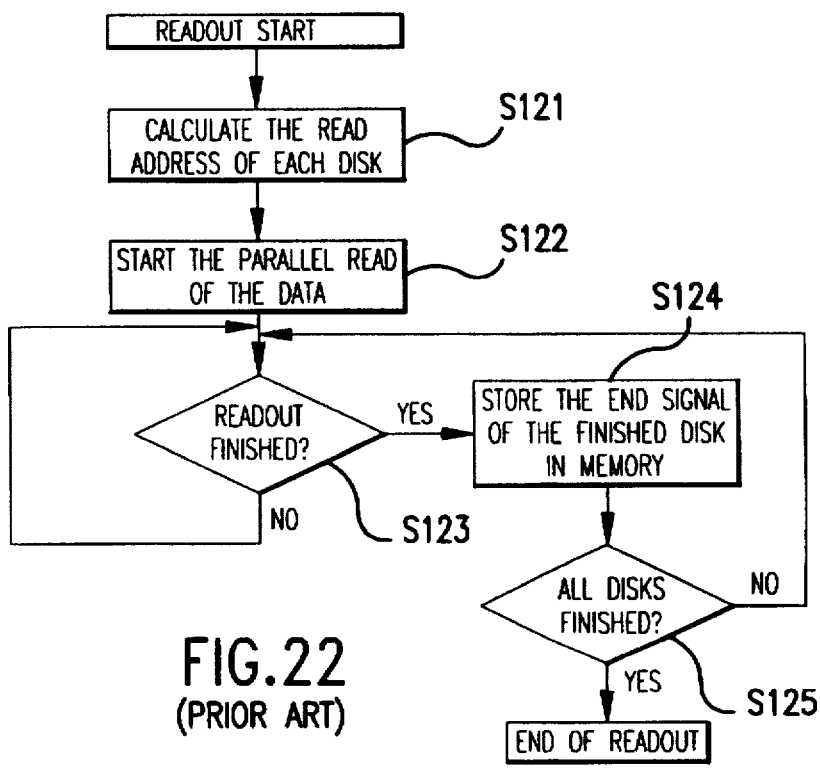
FIG. 22 is a flowchart indicating the readout process of the conventional auxiliary storage.
Figure 23:
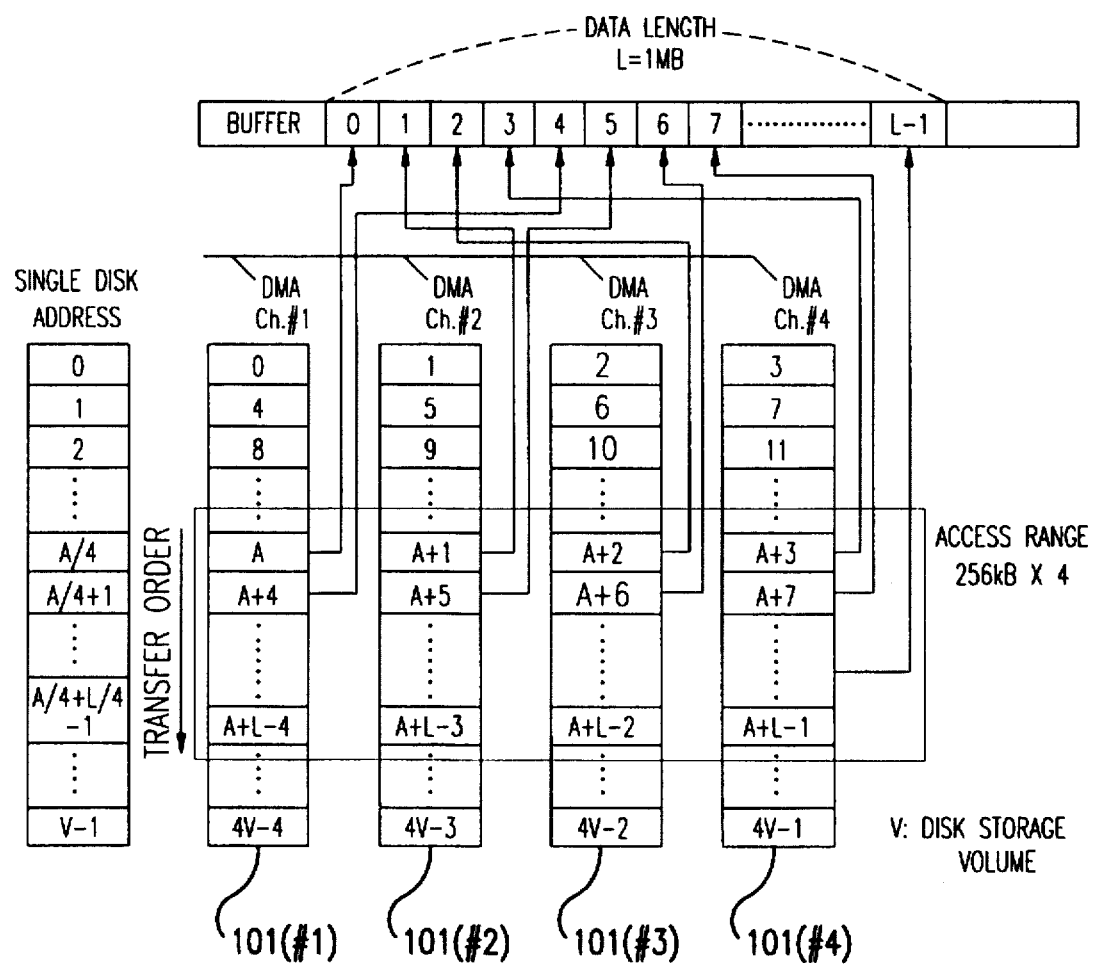
FIG. 23 is an explanatory view of the reading data transfer of the conventional auxiliary storage.

The data configuration in the buffer memory and the disk and data transferring order when the data having a data length L (=1 MB) is read from address A are disclosed in FIG. 18. The unit disk address numbers in those figures are the unique disk address for each disk. The numbers of addresses described in the disk #1 through #4 (31 through 34) are the virtual addresses when the disks are assumed to be configured as one disk unit. The storing address section R as one disk unit and the address section Rij of disk #I, area #j (i, j are independently 1, 2, 3, 4) as each disk are also defined by the above equations (10) and (11), the same as with the data storing process.

Current disk recording methods are transferred from the conventional angle speed constant method to zoning angle speed constant method. The zoning angle speed constant method is a technique to increase the capacity of the disk storage by maintaining the linear recording density at the outer peripheral portion and at the inner peripheral portion of the platter as a component of the disk constant. Since the platter's angle speed is maintained constant, storing and readout speed at the outer peripheral will be increased. Therefore, by actively using the outer peripheral portion, storing and readout speed will be increased.

Generally, disk addresses are numbered from the outer peripheral portion to the inner peripheral portion. Therefore, by using the lower address number as the data storing address, the readout speed will be increased. In this embodiment, insofar as an irregular does not occur, only the data storage areas that have first quarter address numbers are used as the readout access area of the disks because the data is always divided into four blocks and each block is stored in the storage areas that have first quarter address numbers of each disk (fast-accessible addresses).

In addition, increased readout data transfer rate may be expected even when an irregular occurs. For example, if an irregular occurs in disk #2, and the data is compensated from the disk #1, there are two merits:

(1) Since stored data blocks are adjacent to each other, the head moving distance will be minimized. The data in the first block of the disk #2 corresponds to the data in the second block of the disk #1 (adjacent block), which also corresponds to the data in the fourth block of the disk #3 and the data in the third block of the disk #4, respectively.

(2) Since the disk #1 has the same data in mostly the outer portion compared to other disks, data transfer rate will be increased. The data in the first block of the disk #2 is located at the second block, which is located further outer than the third or fourth blocks, of the disk #1, the data at this block is readable much faster than the third block of the disk #4 or the fourth block of the disk #3.

Therefore, when the irregular occurs in the disk #2, even if the readout from the disk #3 or disk #4 are finished much earlier than the data readout from the disk #1, it might be better to read the data from the disk #1 by waiting for the finishing of disk #1. This is determined by the following equation (12):

$$f(S)=S-L/N+T \quad (12)$$

wherein L is the total data transferring length L, N is the number of disks, S is the data transferring length obtained from the data transferring counter and T is the fixed value. f(S) is calculated for disk #1, and if the value f(S) is zero or a positive value, the data readout from the disk #1 will be finished instantly. Therefore, in this case, the supplemental data readout will be done from the disk #1 by waiting until the original data transfer from the disk #1 will be finished. If the value f(S) is a negative value, the original data transferred from the disk #1 will not be finished instantly, and the supplemental readout will be done by using the disk #3 or the disk #4.

Thus, this embodiment will be expected to be done much faster and have a faster data transfer as compared to the conventional parallel-controlled disk array or the second embodiment of the present invention. The timing chart of the data transferring rate at the regular condition and the irregular condition are indicated in FIG. 19(e) and FIG. 20(e), respectively. Both at the regular condition and the irregular condition, the data transferring rate are slightly higher than those of the second embodiment as indicated in FIG. 10(d) and FIG. 20(d).

According to the present invention, the required data transferring rate is assured unless irregular situations occur to all auxiliary storage units (plural disks). As there is no number limitation to the arrayed disks, by establishing more auxiliary storage units (disks), the unassuring probability of the data transferring rate will be unlimitedly close to "zero". For example, p=0.01, N=4 are applied in the equation (4) and (6), pA and pT will be estimated as 0.0394 and $10^{-8}$ respectively. Therefore, the irregular occurring probability will be 1/3940000.

As mentioned before, if the conventional parallel-controlled disk array is applied to a high speed print server, data-transferring interruption will occur for one time per ten hours. However, according to the present invention, such data-transferring interruption will not occur.

In addition, by adopting the data accessing method, the data arrangement and the irregular compensation method as disclosed in the second and third embodiments, an average readout time as well as or more than that of the conventional parallel-controlled disk array is obtained.

As the current cost ratio of the hard drive and the semiconductive memory is about 1/100 and the cost reducing of the hard drive is extremely high whereas the cost reducing of the semiconductive memory is slowing down, cost ratio would be much worse. Therefore, it is by far advantageous to assure the data transfer rate by using plural disks rather than by using semiconductive memory wit respect to cost merit. According to the present invention, both advantages of the cost and the assuring of the data transfer rate will be obtained and the configuration of the high-speed and real-time data transferring system such as high speed print server or the VOD system will be much easier. In addition, even if an irregular occurs in the auxiliary storage, transferring data from the auxiliary storage will be assured and is able to be repaired if at least one storage unit (disk) is working properly.

What is claimed is:

1. An auxiliary storage controlling device comprising:
    a plurality of auxiliary storage units each of which stores the same data;
    a readout system for reading out said data from said plurality of auxiliary storage units simultaneously in response to a readout command;
    a detecting system for detecting one of said auxiliary storage units in which the reading out of said data is finished earliest;
    a selecting system for selecting said data which is read from said detected auxiliary storage unit;
    an irregular detecting system for detecting an irregular auxiliary storage unit which is still operating; and
    a readout prohibiting system for prohibiting a consecutive readout command against said detected irregular auxiliary storage unit.

2. An auxiliary storage controlling device as set forth in claim 1, wherein each of said plurality of auxiliary storage units has a unique irregular occurring timing.

3. An auxiliary storage controlling device as set forth in claim 1, further comprising a buffer system for temporarily storing said data, and said selecting system selects said data from said buffer system.

4. An auxiliary storage controlling device as set forth in claim 1, wherein said plurality of auxiliary storage units are a plurality of rigid disks.

5. An auxiliary storage controlling device comprising:
    a plurality of auxiliary storage units each of which stores the same data in a form of plural data blocks;
    a readout system for reading out said data from said plurality of auxiliary storage units by equal blocks with no overlapping of said data;
    a detecting system for detecting one of said auxiliary storage units in which the readout is delayed;
    an end detecting system for detecting an ended auxiliary storage unit in which the reading out of said data has ended; and
    a supplemental readout means for supplementally reading a data block in which a readout from said delayed auxiliary storage unit is delayed from said ended auxiliary storage unit.

6. An auxiliary storage controlling device as set forth in claim 5, wherein said detecting system detects the occurrence of a delay by using the following equation:

$$f(S,t)=S-Xt+T$$

wherein If f is negative, said delay is detected to be occurring, wherein S is a total amount of said data which is transferred from each of said auxiliary storage units, X is the worst transferring rate of said data of said auxiliary storage unit in a normal condition, t is elapsed time from the beginning of said data transfer, and T is a constant value for each auxiliary storage unit.

7. An auxiliary storage controlling device comprising:
    a total number N of auxiliary storage units, wherein N is an integer not less than two, each of which has order number K (K=1, 2, 3. . . N);
    a first data storing system for storing data, which has data length L and is divided into a number M of blocks ordered by order number J (J=0, 1, 2, . . . M−1), into each of said auxiliary storage units so that all blocks which have order number J are stored to first accessible addresses of said auxiliary storage unit which has order number K consecutively, wherein J is defined as the number where the remainder of M/N will be K−1; and
    a second storing system for storing said data to other addresses which are different from said first accessible addresses.

8. An auxiliary storage controlling device as set forth in claim 7, further comprising:
    a readout system for reading out said data from each auxiliary storage unit, wherein the data length is L/N and the remainder of L/N is rounded up;
    a delay detecting system for detecting a delayed auxiliary storage unit in which the reading out by the readout system is delayed;
    an end detecting system for reading an ended auxiliary storage unit in which the reading out by the readout system has ended; and
    a supplemental readout system for reading out a data block which is stored in said ended auxiliary storage unit, wherein said data block is the same data block stored in said delayed auxiliary storage unit.

9. An auxiliary storage controlling method comprising the steps of:
    reading data out simultaneously from a plurality of auxiliary storage units each of which stores the same data in response to a readout command;
    detecting a finished auxiliary storage unit in which the reading out is finished;
    selecting a data which is read from the detected auxiliary storage unit;
    detecting an operating auxiliary storage unit in which the reading out continues beyond a predetermined timing; and
    prohibiting a consecutive readout from said operating auxiliary storage unit.

10. An auxiliary storage controlling method comprising the steps of:
    reading data having data length L out from a number N of auxiliary storage units, each storage unit storing the same data, wherein the beginning readout position of each auxiliary storage unit is shifted by length L/N, wherein the remainder of L/N is rounded up;
    detecting a delayed auxiliary storage unit in which the reading out is delayed;
    detecting a finished auxiliary storage unit in which the reading out is finished; and
    reading the delayed data from said finished auxiliary storage unit upon the detecting of the delayed auxiliary storage unit.

* * * * *